US012725099B2

(12) United States Patent
Villa et al.

(10) Patent No.: US 12,725,099 B2
(45) Date of Patent: Sep. 1, 2026

(54) DYNAMIC AIRCRAFT ROUTING

(71) Applicant: Joby Aero, Inc., Santa Cruz, CA (US)

(72) Inventors: Ian Andreas Villa, San Francisco, CA (US); Thomas Prevot, San Jose, CA (US); John Conway Badalamenti, Six Mile, SC (US); Mark Moore, Crossville, TN (US)

(73) Assignee: JOBY AERO, INC., Santa Cruz, CA (US)

( * ) Notice: Subject to any disclaimer, the term of this patent is extended or adjusted under 35 U.S.C. 154(b) by 34 days.

(21) Appl. No.: 18/749,087

(22) Filed: Jun. 20, 2024

(65) Prior Publication Data

US 2025/0022378 A1 Jan. 16, 2025

Related U.S. Application Data

(63) Continuation of application No. 17/570,071, filed on Jan. 6, 2022, now Pat. No. 12,057,021, which is a (Continued)

(51) Int. Cl.
*G01C 23/00* (2006.01)
*B64C 29/00* (2006.01)
(Continued)

(52) U.S. Cl.
CPC .......... *G06Q 10/047* (2013.01); *B64C 29/00* (2013.01); *B64C 29/0016* (2013.01); (Continued)

(58) Field of Classification Search
CPC .... G08G 5/003; G08G 5/0013; G08G 5/0034; G08G 5/0039; G08G 5/0043;
(Continued)

(56) References Cited

U.S. PATENT DOCUMENTS 3,035,789 A 5/1962 Young
4,022,405 A 5/1977 Peterson
(Continued)

FOREIGN PATENT DOCUMENTS

EP 0945841 A1 9/1999
EP 2620932 A1 7/2013
(Continued)

OTHER PUBLICATIONS

"U.S. Appl. No. 16/169,726, Final Office Action mailed Aug. 14, 2019", 9 pages.
(Continued)

*Primary Examiner* — Shardul D Patel
(74) *Attorney, Agent, or Firm* — Dority & Manning, P.A.

(57) ABSTRACT

A request for transport services that identifies a rider, an origin, and a destination is received from a client device. Eligibility of the request to be serviced by a vertical take-off and landing (VTOL) aircraft is determined based on the origin and the destination. A transportation system determines a first and a second hub for a leg of the transport request serviced by the VTOL aircraft and calculates a set of candidate routes from the first hub to the second hub. A provisioned route is selected from among the set of candidate routes based on network and environmental parameters and objectives including pre-determined acceptable noise levels, weather, and the presence and planned routes of other VTOL aircrafts along each of the candidate routes.

20 Claims, 10 Drawing Sheets

Related U.S. Application Data continuation of application No. 16/405,493, filed on May 7, 2019, now Pat. No. 11,244,572.

(60) Provisional application No. 62/668,745, filed on May 8, 2018, provisional application No. 62/668,176, filed on May 7, 2018.

(51) Int. Cl.

| | |
|---|---|
| ***G01C 21/20*** | (2006.01) |
| ***G01C 21/34*** | (2006.01) |
| ***G06Q 10/047*** | (2023.01) |
| ***G06Q 10/0631*** | (2023.01) |
| ***G08G 5/26*** | (2025.01) |
| ***G08G 5/30*** | (2025.01) |
| ***G08G 5/32*** | (2025.01) |
| ***G08G 5/34*** | (2025.01) |
| ***G08G 5/56*** | (2025.01) |
| *G05D 1/654* | (2024.01) |
| *G05D 109/22* | (2024.01) |

(52) U.S. Cl.

CPC ......... *G01C 21/20* (2013.01); *G01C 21/3461* (2013.01); *G06Q 10/06315* (2013.01); *G08G 5/26* (2025.01); *G08G 5/30* (2025.01); *G08G 5/32* (2025.01); *G08G 5/34* (2025.01); *G08G 5/56* (2025.01); *B64C 29/0025* (2013.01); *B64C 29/0033* (2013.01); *B64C 2220/00* (2013.01); *G05D 1/654* (2024.01); *G05D 2109/23* (2024.01); *G10K 2210/1281* (2013.01); *G10K 2210/3016* (2013.01); *G10K 2210/30231* (2013.01)

(58) Field of Classification Search

CPC .. G08G 5/0026; G08G 5/0069; G08G 5/0091; B64C 29/00; B64C 29/0016; B64C 29/0025; B64C 29/0033; B64C 2220/00; B64C 3/10; B64C 27/22; B64C 27/24; B64C 27/26; B64C 27/30; G01C 21/20; G01C 21/3461; G01C 23/00; G01C 21/3453; G01C 23/005; G05D 1/0202; G05D 1/102; G06Q 10/047; G06Q 10/06315; G10K 2210/1281; G10K 2210/3016; G10K 2210/30231; B64D 27/24

USPC .......................................................... 701/528

See application file for complete search history.

(56) References Cited

U.S. PATENT DOCUMENTS 5,823,468 A 10/1998 Bothe
5,839,691 A 11/1998 Lariviere
5,842,667 A 12/1998 Jones
6,343,127 B1 1/2002 Billoud
6,892,980 B2 5/2005 Kawai
6,974,105 B2 12/2005 Pham
7,648,338 B1 1/2010 Welsh
7,665,688 B2 2/2010 Cylinder et al.
8,016,226 B1 9/2011 Wood
8,020,804 B2 9/2011 Yoeli
8,311,686 B2* 11/2012 Herkes .................... G08G 5/20 701/14
8,733,690 B2 5/2014 Bevirt et al.
8,737,634 B2 5/2014 Brown et al.
8,849,479 B2 9/2014 Walter
8,931,732 B2 1/2015 Sirohi et al.
9,205,930 B2 12/2015 Yanagawa
9,387,928 B1 7/2016 Gentry et al.
9,415,870 B1 8/2016 Beckman et al.
9,422,055 B1 8/2016 Beckman et al.
9,435,661 B2 9/2016 Brenner et al.
9,442,496 B1 9/2016 Beckman et al.
9,550,561 B1 1/2017 Beckman et al.
9,663,237 B2 5/2017 Senkel et al.
9,694,911 B2 7/2017 Bevirt et al.
9,771,157 B2 9/2017 Gagne et al.
9,776,715 B2 10/2017 Zhou et al.
9,786,961 B2 10/2017 Dyer et al.
9,802,702 B1 10/2017 Beckman et al.
9,816,529 B2 11/2017 Grissom et al.
9,828,107 B1 11/2017 Ruymgaart et al.
9,838,436 B2 12/2017 Michaels
10,011,346 B2 7/2018 Beckman et al.
10,122,806 B1 11/2018 Florissi et al.
10,140,873 B2 11/2018 Adler et al.
10,152,894 B2 12/2018 Adler et al.
10,216,190 B2 2/2019 Bostick et al.
10,249,200 B1 4/2019 Grenier et al.
10,304,344 B2 5/2019 Moravek et al.
10,330,482 B2 6/2019 Chen et al.
10,370,098 B1 8/2019 Beckman et al.
10,518,595 B2 12/2019 Dietrich
10,593,215 B2 3/2020 Villa
10,593,217 B2 3/2020 Shannon
10,752,365 B2 8/2020 Galzin
10,759,537 B2 9/2020 Moore et al.
10,768,201 B2 9/2020 Luo et al.
10,832,581 B2 11/2020 Westervelt et al.
10,836,470 B2 11/2020 Liu et al.
10,913,528 B1 2/2021 Moore et al.
10,948,910 B2 3/2021 Taveira et al.
10,960,785 B2 3/2021 Villanueva et al.
10,960,975 B1 3/2021 Villa
11,130,566 B2 9/2021 Mikic et al.
11,145,211 B2 10/2021 Goel et al.
11,238,745 B2 2/2022 Villa et al.
11,295,622 B2 4/2022 Goel et al.
2006/0155464 A1 7/2006 Smartt
2009/0157293 A1 6/2009 Cornett et al.
2009/0164260 A1 6/2009 Kane
2010/0079342 A1 4/2010 Smith et al.
2010/0172510 A1 7/2010 Juvonen
2011/0056183 A1 3/2011 Sankrithi
2011/0087428 A1 4/2011 Barnetche et al.
2012/0237049 A1 9/2012 Brown et al.
2012/0309445 A1 12/2012 Tsui et al.
2014/0179535 A1 6/2014 Stückl et al.
2015/0379874 A1 12/2015 Ubhi et al.
2016/0311529 A1 10/2016 Brotherton-Ratcliffe et al.
2016/0368600 A1 12/2016 Frolov et al.
2017/0197710 A1 7/2017 Ma
2017/0274983 A1 9/2017 Beckman et al.
2017/0357914 A1 12/2017 Tulabandhula et al.
2018/0018887 A1 1/2018 Sharma et al.
2018/0029431 A1 2/2018 Tang et al.
2018/0053425 A1* 2/2018 Adler ....................... G08G 5/54
2018/0061245 A1 3/2018 Alder et al.
2018/0082597 A1 3/2018 Nicol et al.
2018/0216988 A1 8/2018 Nance
2018/0286254 A1 10/2018 Westervelt et al.
2018/0286372 A1 10/2018 Beckman et al.
2018/0308366 A1 10/2018 Goel et al.
2018/0331940 A1 11/2018 Jadhav et al.
2018/0354636 A1* 12/2018 Darnell ................... B64C 19/00
2019/0023385 A1 1/2019 Nguyen
2019/0033084 A1 1/2019 Chen et al.
2019/0047342 A1 2/2019 Dietrich
2019/0120640 A1 4/2019 Ho et al.
2019/0135426 A1 5/2019 Bailie
2019/0146508 A1 5/2019 Dean et al.
2019/0221127 A1* 7/2019 Shannon ................ G06Q 50/40
2019/0250636 A1 8/2019 Szubbocsev
2019/0316849 A1 10/2019 Abrego et al.
2019/0340933 A1 11/2019 Villa
2019/0340934 A1 11/2019 Villa et al.
2019/0340937 A1 11/2019 Villa

(56) References Cited

U.S. PATENT DOCUMENTS

| | | | |
|---|---|---|---|
| 2020/0103922 | A1 | 4/2020 | Nonami et al. |
| 2020/0388166 | A1 | 12/2020 | Rostamzadeh et al. |
| 2021/0061459 | A1 | 3/2021 | Erengil et al. |

FOREIGN PATENT DOCUMENTS

| | | | |
|---|---|---|---|
| EP | 2698749 | A1 | 2/2014 |
| EP | 3499634 | A1 | 6/2019 |
| JP | 2010095246 | A | 4/2010 |
| JP | 2013086795 | A | 5/2013 |
| WO | WO 2016/093905 | | 6/2016 |
| WO | WO 2018/023556 | | 2/2018 |
| WO | WO 2018023556 | A1 | 2/2018 |
| WO | WO 2019089677 | A1 | 5/2019 |
| WO | WO 2019/217427 | | 11/2019 |
| WO | WO 2020/251988 | | 12/2020 |
| WO | WO 2020/252024 | | 12/2020 |
| WO | WO 2020252024 | A1 | 12/2020 |

OTHER PUBLICATIONS

"U.S. Appl. No. 16/169,726, Non Final Office Action—Prioritized Exam mailed Mar. 25, 2019", 9 pages.
"U.S. Appl. No. 16/169,726, Notice of Allowance mailed Nov. 6, 2019", 5 pages.
"U.S. Appl. No. 16/169,726, Response filed Jun. 24, 2019 to Non-Final Office Action—Prioritized Exam mailed Mar. 25, 2019", 18 pages.
"U.S. Appl. No. 16/169,726, Response filed Oct. 23, 2019 to Final Office Action mailed Aug. 14, 2019", 10 pages.
"U.S. Appl. No. 16/405,493, Preliminary Amendment filed Apr. 23, 2020", 7 pages.
"U.S. Appl. No. 16/405,493, Response filed Sep. 14, 2021 to Non Final Office Action mailed Jun. 14, 2021", 8 pages.
"U.S. Appl. No. 16/437,745, Final Office Action mailed Jun. 10, 2021", 12 pages.
"U.S. Appl. No. 16/437,745, Non Final Office Action mailed Mar. 4, 2021", 16 pages.
"U.S. Appl. No. 16/437,745, Notice of Allowance mailed Sep. 23, 2021", 8 pages.
"U.S. Appl. No. 16/437,745, Response filed Jun. 2, 2021 to Non Final Office Action mailed Mar. 4, 2021", 10 pages.
"U.S. Appl. No. 16/437,745, Response filed Sep. 9, 2021 to Final Office Action mailed Jun. 10, 2021", 12 pages.
"Application Serial No. PCT US2020 036953, Written Opinion of the International Preliminary Examining Authority mailed May 4, 2021", 4 pages.
"European Application Serial No. 19726243.9, Communication Pursuant to Article 94(3) EPC mailed Dec. 17, 2021", 6 pages.
"European Application Serial No. 19726243.9, Response to Communication Pursuant to Rules 161 and 162 filed Jun. 25, 2021", 13 pages.
"International Application Serial No. PCT US2019 031124, International Preliminary Report on Patentability mailed Nov. 19, 2020", 9 pages.
"International Application Serial No. PCT US2019 031124, International Search Report mailed Jul. 19, 2019", 5 pages.
"International Application Serial No. PCT US2019 031124, Written Opinion mailed Jul. 19, 2019", 7 pages.
"International Application Serial No. PCT US2020 036953, International Search Report mailed Sep. 10, 2020", 5 pages.
"International Application Serial No. PCT US2020 036953, Written Opinion mailed Sep. 10, 2020", 6 pages.
"International Application Serial No. PCT US2020 037002, International Search Report mailed Sep. 24, 2020", 4 pages.
"International Application Serial No. PCT US2020 037002, Written Opinion mailed Sep. 24, 2020", 7 pages.
"International Application Serial No. PCT US2020 036953, International Preliminary Report on Patentability mailed Sep. 10, 2021", 8 pages.
"International Application Serial No. PCT US2020 037002, International Preliminary Report on Patentability mailed Dec. 14, 2021", 8 pages.
U.S. Appl. No. 16/169,726, filed Oct. 24, 2018, 32 pages.
Bennaceur et al., "Passenger-centric urban air mobility: Fairness trade-offs and operational efficiency", Transportation Research Part C: Emerging Technologies, 2022, 29 pages.
De Jong, "Optimizing cost effectiveness and flexibility of air taxis", Haarlem, 2007, 62 pages.
Downing et al., "Noise Simulation Modeling for Airport Noise Analysis Noise Simulation Modeling for Airport 6 Noise Analysis", The 33rd International Congress and Exposition on Noise Control Engineering, 2004, 9 pages.
Drupka et al., "An airspace model applicable for automatic flight route planning inside free route airspace", Scientific Letters of Rzeszow University of Technology—Mechanics, 2018, pp. 5-18.
Givargis et al., "A basic neural traffic noise prediction model for Tehran's roads", Journal of Environmental Management, Elsevier, Amsterdam, NL, vol. 91, No. 12, 2010, pp. 2529-2534.
Jang et al., "Concepts of airspace structures and system analysis for uas traffic flows for urban areas", AIM InformationSystems—AIM Infotech@ Aerospace, 0449, 2017, 16 pages.
Jong, "Optimizing cost effectiveness and flexibility of air taxis: A case study for optimization of air taxi operations", University of Twente, Master's thesis, 2007, 62 pages.
Miao et al., "Data-driven robust taxi dispatch under demand uncertainties", IEEE Transactions on Control Systems Technology 27, No. 1, 2017, 16 pages.
Miao et al., "Taxi dispatch with real-time sensing data in metropolitan areas: A receding horizon control approach", In Proceedings of the ACM/IEEE Sixth International Conference on Cyber-Physical Systems, 2015, 15 pages.
Peterson, "Fast Forwarding to a World of On-Demand Air Transportation", Smart Urban Transportation Forum, 2017, 44 pages.
Peterson, "Fast Forwarding to a World of On-Demand Air Transportation Part 2 of 2", Smart Urban Transportation Forum, 2017, 23 pages.
Uber, "Fast-Forwarding to a Future of On-Demand Urban Air Transportation", Uber Elevate, 2016, 98 pages.
Uber, "Fast-forwarding to a future of on-demand urban air transportation", 2016, 99 pages.
Van Der Zwan et al, "Development of an Aircraft Routing System for an Air Taxi Operator", 2016, 24 pages.
Yang et al., "Airport noise simulation using neural networks", Neural Networks, 2008. IJCNN 2008. {IEEE World Congress on Computational Intelligence). IEEE International Joint Conference on, IEEE, 2008, pp. 1917-1923.

* cited by examiner

DYNAMIC AIRCRAFT ROUTING

PRIORITY CLAIM

This present application is a continuation of U.S. Non-Provisional application Ser. No. 17/570,071, filed Jan. 6, 2022, which is a continuation of U.S. Non-Provisional application Ser. No. 16/405,493, filed May 7, 2019 (now issued as U.S. Pat. No. 11,244,572 on Feb. 8, 2022), which claims the benefit of U.S. Provisional Application No. 62/668,176, filed May 7, 2018, and U.S. Provisional Application No. 62/668,745, filed May 8, 2018. Applicant incorporates all such applications by reference herein in their respective entireties.

TECHNICAL FIELD

The subject matter described herein generally relates to aviation transport networks, and in particular to dynamic aircraft routing based on noise, weather, and network data.

BACKGROUND

There is generally a wide variety of modes of transport available within cities. People may walk, ride a bike, drive a car, take public transit, use a ride sharing service, and the like. However, as population densities and demand for land increase, many cities are increasingly experiencing problems with traffic congestion and the associated pollution. Consequently, there is a need to expand the available modes of transport in ways that may reduce the amount of traffic without requiring the use of large amounts of land.

SUMMARY

Aspects and advantages of embodiments of the present disclosure will be set forth in part in the following description, or can be learned from the description, or can be learned through practice of the embodiments.

Example aspects of the present disclosure are directed to various systems, apparatuses, non-transitory computer-readable media, user interfaces, and electronic devices. For instance, a transport network coordination system determines a provisioned route for transport services by a VTOL aircraft from a first hub to a second hub and provides routing information to the VTOL aircraft responsive to determining the provisioned route. Network and environmental parameters such as the number of VTOL aircraft that will be at the origin hub within a specified time period, the number of VTOL aircraft that have a planned route between the origin hub and the destination hub, and pre-determined acceptable noise levels in the vicinity of the hubs may be used to generate candidate routes for the VTOL aircraft. Candidate route may optimize for a different parameter or combination of parameters, for example, avoiding routes through areas in which the pre-determined acceptable noise level is low or routes that pass within a threshold distance of planned routes for a number of other VTOL aircraft. The system calculates a noise profile for each candidate route and may select a candidate route that has the earliest estimated time of arrival at the destination hub and that does not exceed a threshold noise level at any point along the route. In other embodiments, different network and/or environmental parameters may be used to select the preferred route.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

FIG. 10 shows a network of vertiports and flights between.

DETAILED DESCRIPTION

Figure 1:
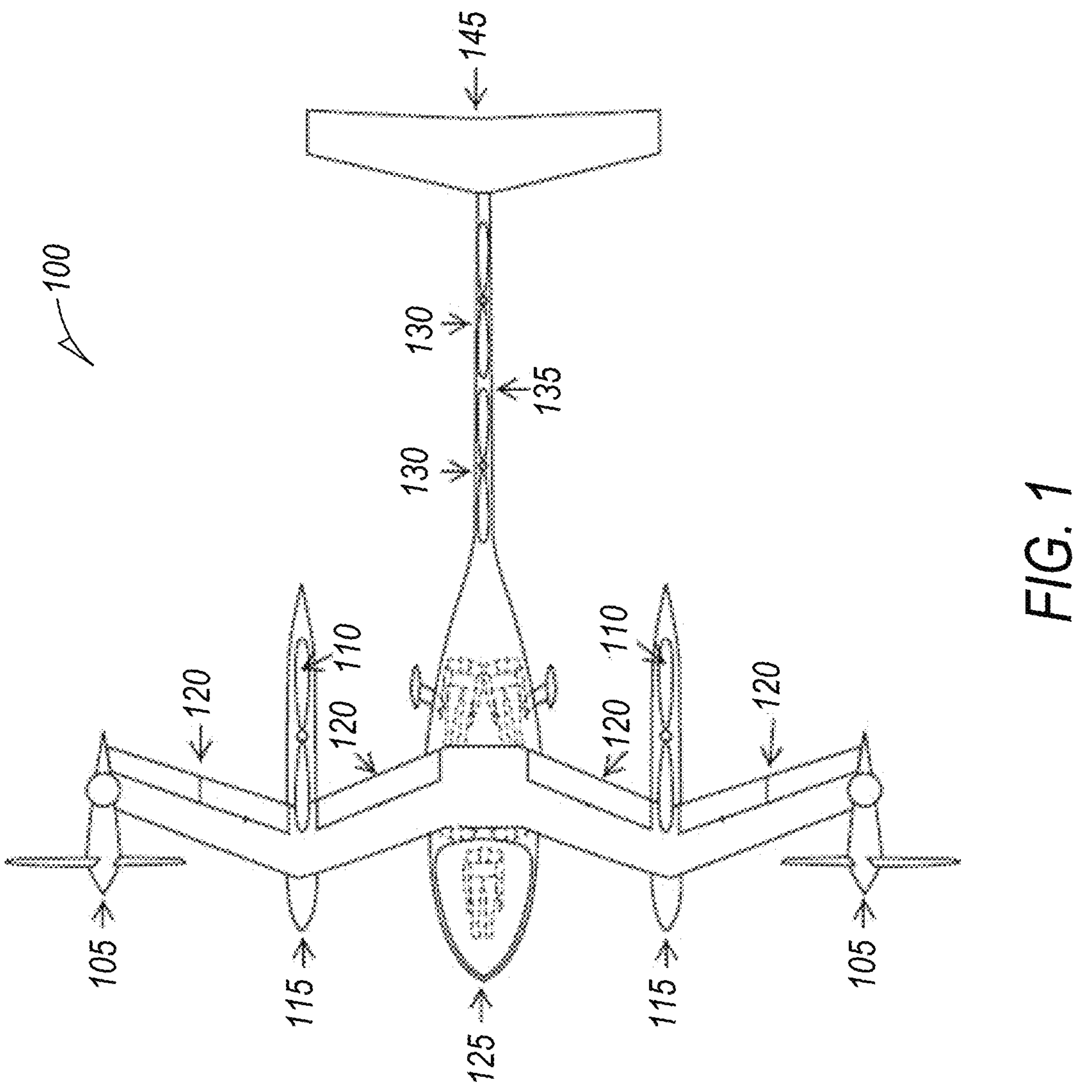
FIG. 1 illustrates an electric VTOL aircraft, in accordance with an embodiment.

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Air travel within cities has been limited compared to ground travel. Air travel can have a number of requirements making intra-city air travel difficult. For instance, aircraft can require significant resources such as fuel and infrastructure (e.g., runways), produce significant noise, and require significant time for boarding and alighting, each presenting technical challenges for achieving larger volume of air travel within cities or between neighboring cities. However, providing such air travel may reduce travel time over purely ground-based approaches as well as alleviate problems associated with traffic congestion.

Vertical take-off and landing (VTOL) aircraft provide opportunities to incorporate aerial transportation into transport networks for cities and metropolitan areas. VTOL aircraft require much less space to take-off and land relative to traditional aircraft. In addition, developments in battery technology have made electric VTOL aircraft technically and commercially viable. Electric VTOL aircraft may be quieter than aircraft using other power sources, which further increases their viability for use in built-up areas where noise may be a concern.

Some embodiments of the present disclosure relate to real-time mitigation of an aircraft's noise signature and perceived noise impact by observers using onboard sensing, network data, and temporal noise data at a geolocation assuming a trajectory that has been defined or predetermined.

In normal operation, a transport network coordination system may determine optimal trips or trajectories for air vehicles to fly. Part of determining optimality is reducing the impact of the vehicle's noise signature on the environment the vehicle flies over. While the vehicle may utilize onboard sensors to determine their noise impact, a vehicle may also utilize offboard sensing, network, and predictive temporal data for noise signature mitigation. By building a composite understanding of real data offboard the aircraft, the aircraft can make adjustments to the way it is flying and verify this against a predicted noise signature (via computational methods) to reduce environmental impact. For an arbitrary configuration, this might be realized via a change in translative speed, propeller speed, or choices in propulsor usage (e.g., a quiet propulsor vs. a high thrust, noisier propulsor). These noise mitigation actions may also be decided at the network level rather than the vehicle level to balance concerns across a city and relieve computing constraints on the aircraft.

In other embodiments, various approaches are used to understand noise levels around vertiports. In one embodiment, a method for location based noise collection for the purpose of characterizing a vertiport's noise signature and quantifying community acceptance includes data collection is enabled by microphones within a distance from the vertiport and processed by the network to filter for data quality, relative location, and directionality of collection.

In other embodiments, a distributed array of sensors is used to gather operational data. This array can cover various communication bands and may be composed of sonic, ultrasonic, IR, LIDAR, lighting, barometric, humidity, temperature, camera, and radar systems. This array solution can be distributed across a vertiport to support a multitude of use cases and in various geographic locations. Moreover, in one embodiment, the array is modular and may allow integration across different vertiport types to support low and high throughput.

The data collected by the array may enable improved landing and/or takeoff at a vertiport by an aircraft given microclimate weather conditions and an understanding of in-operation aircraft controllability in various flight modes. The data collected by the array may also be used in mitigating the overall noise signature of a vertiport. In one embodiment, this is achieved through the alteration of operations via throughput, routing, and aircraft selected for landing/departure. This can be enabled through real noise data (collected via the vertiport, adjacent aircraft, ground based infrastructure, ground observers, and ground vehicles) and estimated noise data (analyzed via computational aerodynamics/aeroacoustics/perception) which can be combined for composite understandings.

Example Vertical Take-Off and Landing Aircraft

Turning now to the specifics of the vehicle, FIG. 1 illustrates one embodiment of an electric VTOL aircraft 100. In the embodiment shown in FIG. 1, the VTOL aircraft 100 is a battery-powered aircraft that transitions from a vertical take-off and landing state with stacked lift propellers to a cruise state on fixed wings.

The VTOL aircraft 100 has an M-wing configuration such that the leading edge of each wing is located at an approximate midpoint of the wing. The wingspan of a VTOL aircraft 100 includes a cruise propeller 105 at the end of each wing, a stacked wing propeller 110 attached to each wing boom 115 behind the middle of the wing, and wing control surfaces 120 spanning the trailing edge of each wing. At the center of the wingspan is a fuselage 125 with a passenger compartment that may be used to transport passengers and/or cargo. The VTOL aircraft 100 further includes two stacked tail propellers 130 attached to the fuselage tail boom 135 and a hinged control surface 140 (not shown) spanning the bottom length of the tail boom 135. A lifting T-tail 145 provides stability to the VTOL aircraft 100.

During vertical assent of the VTOL aircraft 100, the rotating cruise propellers 105 on the nacelles are pitched upward at a 90-degree angle and the stacked propellers 110 and 130 are deployed from the wing booms 115 and the tail boom 135 to provide lift. The wing control surfaces 120 are pitched downward and the tail control surface 140 tilts to control rotation about the vertical axis during takeoff. As the VTOL aircraft 100 transitions to a cruise configuration, the nacelles rotate downward to a zero-degree position such that the cruise propellers 105 are able to provide forward thrust. Control surfaces 120 and 140 return to a neutral position with the wings and tail boom 135, and the stacked lift propellers 110 and 130 stop rotating and retract into cavities in the wing booms 115 and tail boom 135 to reduce drag during forward flight.

During transition to a descent configuration, the stacked propellers 110 and 130 are redeployed from the wing booms 115 and tail boom 135 and begin to rotate along the wings and tail to generate the lift required for descent. The nacelles rotate back upward to a 90-degree position and provide both thrust and lift during the transition. The hinged control surfaces 120 on the wings are pitched downward to avoid the propeller wake, and the hinged surfaces on the tail boom control surfaces 140 and tail tilt for yaw control.

Figure 2:
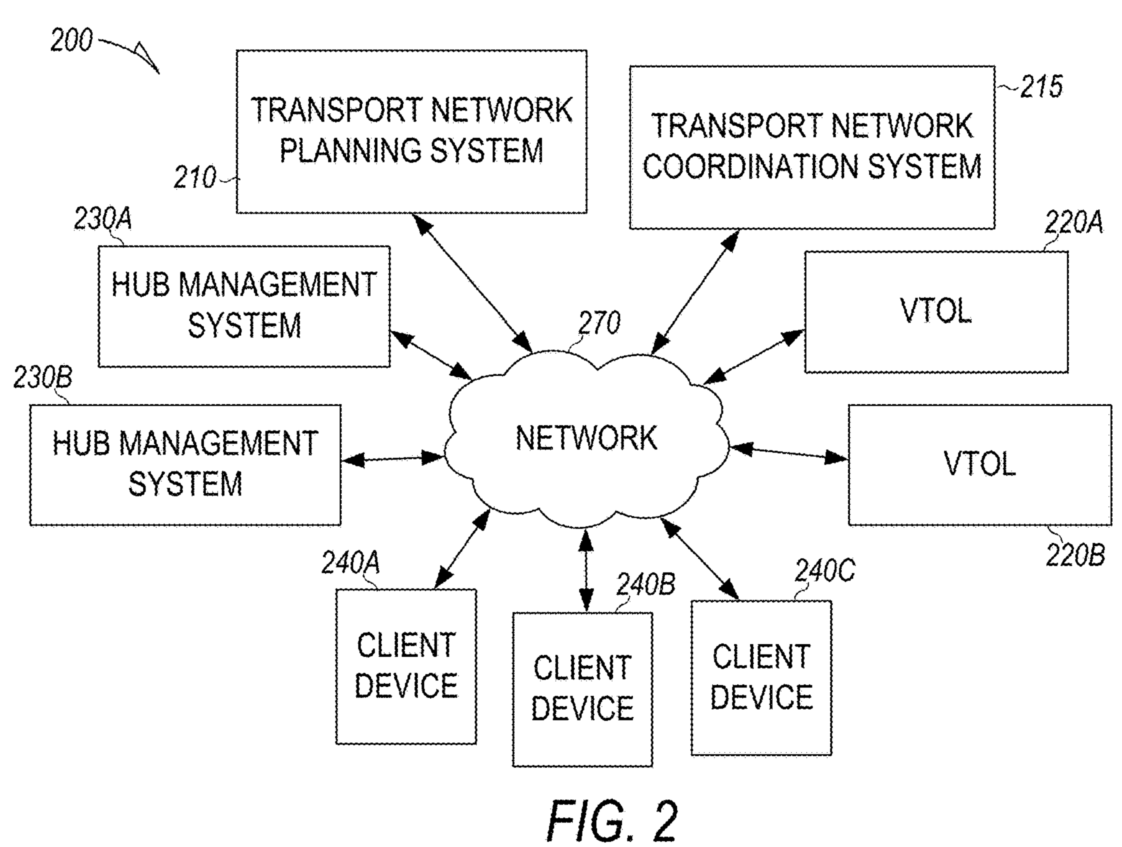
FIG. 2 is a high-level block diagram illustrating a computing environment associated with a transport network, in accordance with an embodiment.

FIG. 2 illustrates one embodiment of a computing environment 200 associated with an aviation transport network. In the embodiment shown in FIG. 2, the computing environment 200 includes a transport network planning system 210, a transport network coordination system 215, a set of VTOL aircraft 220*a*, 220*b*, a set of hub management systems 230*a*, 230*b*, and a set of client devices 240*a*, 240*b*, all connected via a network 270. In some aspects, the VTOL aircraft 100 discussed above with respect to FIG. 1 may be included in one or more of the VTOL aircraft 220*a* and/or 220*b*.

When multiple instances of a type of entity are depicted and distinguished by a letter after the corresponding reference numeral, such entities shall be referred to herein by the reference numeral alone unless a distinction between two different entities of the same type is being drawn. In other embodiments, the computing environment 200 contains different and/or additional elements. In addition, the functions may be distributed among the elements in a different manner than described. For example, the hub management systems 230 may be omitted with information about the hubs stored and updated at the transport network planning system 210.

The transport network planning system 210 assists in the planning and design of the transport network. In one embodiment, the transport network planning system 110 estimates demand for transport services, suggests locations for VTOL hubs to meet that demand, and simulates the flow of riders and VTOL aircraft between hubs to assist in network planning. In one embodiment, suggested locations for VTOL hubs may be based in part on environmental factors such as the type of area (e.g., commercial or residential), pre-determined acceptable noise levels in the area, historical weather patterns in the area, and/or other nearby transportation hubs (e.g., existing VTOL hubs, airports, train stations, etc.). The transport network planning system 210 obtains environmental data from publicly available data sources and stores the data in a map data store 325 or an environmental data store (not shown) for use by the transport network coordination system 215. The transport network planning system 210 further stores the locations of VTOL hubs in a hub data store (not shown).

The transport network coordination system 215 determines a route for transport services by a VTOL aircraft 220 from a first hub to a second hub and provides routing information to the VTOL aircraft 220, including what time to leave a first hub, which hub to fly to after departure, way points along the route, how long to spend charging before departure from the first hub or upon arrival at the second hub, and the identity of individuals to carry. The network coordination system 215 can determine the route based at least partly on an optimization process. The transport network coordination system 215 may also direct certain VTOL aircraft 220 to fly between hubs without riders to improve fleet distribution (referred to as "deadheading"). Various embodiments of the transport network coordination system 215 are described in greater detail below, with reference to FIG. 3.

The transport network coordination system 215 is further configured as a communicative interface between the various entities of the computing environment 200 and is one means for performing this function. The transport network coordination system 215 is configured to receive sets of service data representing requests for transportation services from the client devices 240 and creates corresponding service records in a transportation data store (not shown). According to an example, a service record corresponding to a set of service data can include or be associated with a service ID, a user ID, an origin hub, a destination hub, a service type, pricing information and/or a status indicating that the corresponding service data has not been processed. In one embodiment, when the transport network coordination system 215 selects a VTOL aircraft 220 to provide the transportation service to the user, the service record can be updated with information about the VTOL aircraft 220 as well as the time the request for service was assigned.

The VTOL aircraft 220 are vehicles that fly between hubs in the transport network. A VTOL aircraft 220 may be controlled by a human pilot (inside the vehicle or on the ground) or it may be autonomous. In one embodiment, the VTOL aircraft 220 are battery-powered aircraft that use a set of propellers for horizontal and vertical thrust, such as the VTOL aircraft shown in FIG. 1. The configuration of the propellers enables the VTOL aircraft 220 to take-off and land vertically (or substantially vertically). For convenience, the various components of the computing environment 200 will be described with reference to this embodiment. However, other types of aircraft may be used, such as helicopters, planes that take-off at angles other than vertical, and the like. The term VTOL should be construed to include such vehicles.

A VTOL aircraft 220 may include a computer system that communicates status information (e.g., via the network 270) to other elements of the computing environment 200. The status information may include current location, planned route, current battery charge, potential component failures, and the like. The computer system of the VTOL aircraft 220 may also receive information, such as routing and weather information and information regarding the current location and planned routes of VTOL aircraft 220 in the vicinity of the VTOL aircraft 220. Further, in some embodiments, the computer system of the VTOL aircraft 220 collects noise and weather data (e.g., data collected from other vehicles) and transmits the data to the transport network coordination system 215. Although two VTOL aircraft 220 are shown in FIG. 2, a transport network can include any number of VTOL aircraft 220.

Hub management systems 230 provide functionality at hubs in the transport network. A hub is a location at which VTOL aircraft 220 are intended to take off and land. Within a transport network, there may be different types of hub. For example, a hub in a central location with a large amount of rider throughput might include sufficient infrastructure for sixteen (or more) VTOL aircraft 220 to simultaneously (or almost simultaneously) take off or land. Similarly, such a hub might include multiple charging stations for recharging battery-powered VTOL aircraft 220. In contrast, a hub located in a sparsely populated suburb might include infrastructure for a single VTOL aircraft 220 and have no charging station. The hub management system 230 may be located at the hub or remotely and be connected via the network 270. In the latter case, a single hub management system 130 may serve multiple hubs.

In one embodiment, a hub management system 230 monitors the status of equipment at the hub and reports to the transport network planning system 210. For example, if there is a fault in a charging station, the hub management system 230 may automatically report that it is unavailable for charging VTOL aircraft 220 and request maintenance or a replacement. The hub management system 230 may also control equipment at the hub. For example, in one embodiment, a hub includes one or more launch pads that may move from a takeoff/landing position to embarking/disembarking position. The hub management system 230 may control the movement of the launch pad (e.g., in response to instructions received from transport network coordination system 215 and/or a VTOL aircraft 220).

The client devices 240 are computing devices with which users may arrange transport services within the transport network. Although three client devices 240 are shown in FIG. 2, in practice, there may be many more (e.g., thousands or millions of) client devices connected to the network 270. In one embodiment, the client devices 240 are mobile devices (e.g., smartphones, tablets, etc.) running an application for arranging transport services. A user provides a pickup location and destination within the application and the client device 240 sends a request for transport services to the transport services coordination system 215. Alternatively, the user may provide a destination and the pickup location is determined based on the user's current location (e.g., as determined from GPS data for the client device 240).

The network 270 provides the communication channels via which the other elements of the networked computing environment 200 communicate. The network 270 can include any combination of local area and/or wide area networks, using both wired and/or wireless communication systems. In one embodiment, the network 270 uses standard communications technologies and/or protocols. For example, the network 270 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 270 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 270 may be represented using any suitable format, such as hypertext markup language (HTML) or extensible markup language (XML). In some embodiments, all or some of the communication links of the network 270 may be encrypted using any suitable technique or techniques.

Figure 3:
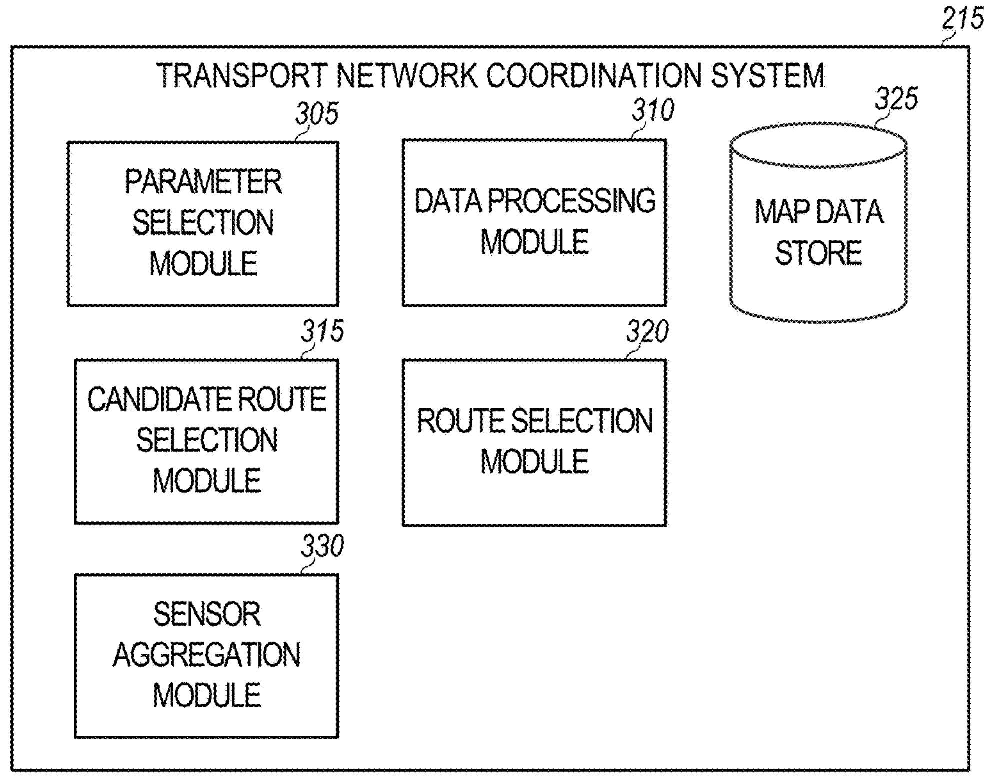
FIG. 3 is a high-level block diagram illustrating the transport network coordination system shown in FIG. 2, in accordance with an embodiment.

FIG. 3 illustrates one embodiment of the transport network coordination system 215. The transport network coordination system 215 determines a provisioned route for transport services by the VTOL aircraft 220 from a first hub to a second hub based on noise and weather data and data regarding the current locations and planned routes of other VTOL aircraft 220 within a threshold distance of the VTOL aircraft 220.

In the embodiment shown in FIG. 3, the transport network coordination system 215 includes a parameter selection module 305, a data processing module 310, a candidate route selection module 315, and a route selection module 320. In other embodiments, the transport network coordination system 215 includes different and/or additional elements. In addition, the functions may be distributed among the elements in a different manner than described.

The parameter selection module 305 provides a user interface for defining various parameters to be used in the optimization of VTOL route selection. In one embodiment, the definable parameters include network and environmental parameters and objectives. Network and environmental parameters may include a number of VTOL aircraft 220 that will be at the first hub within a specified time period, a number of VTOL aircraft 220 with a planned route between the first hub or the second hub, the presence and locations of VTOL hubs between the first hub and the second hub and the number and schedule of VTOL aircraft 220 intended to take-off or land at the VTOL hubs, environmental noise between the first hub and the second hub, the presence and location of other transportation hubs, current and predicted weather between the first hub and the second hub, and pre-determined acceptable noise levels between the first hub and the second hub.

The network and environmental objectives may be to (1) avoid routes through areas in which the pre-determined acceptable noise level is low (e.g., residential neighborhoods), (2) avoid areas of high environmental noise (e.g., train stations), (3) avoid routes that pass within a threshold distance of other transportation hubs (e.g., airports), (4) avoid routes where the current and/or predicted weather is unfavorable (e.g., high wind gusts or forces), (5) avoid routes that pass within a threshold distance of one or more VTOL hubs, (6) avoid routes that pass within a threshold distance of planned routes for a given number of other VTOL aircraft 220, (7) minimize predicted travel time, (8) minimize total distance traveled, and the like.

The data processing module 310 accesses network and environmental data needed to calculate candidate routes for VTOL travel based on one or more selected parameters and/or objectives. In one embodiment, the data processing module 310 queries the transport network planning system 210 to obtain data regarding the locations of VTOL hubs as well as the environmental data in the vicinity of the first hub and the second hub. In one embodiment, the data processing module 310 tracks localized weather and noise data and differentiates contributions from various actors (e.g., determines the type of cloud producing rain, determines whether a detected noise is due to birds or other VTOL aircraft, etc.).

In some aspects, the data processing module 310 further queries the map data store 325 to obtain data regarding the presence, location, and planned routes of VTOL aircraft between the first hub and the second hub. The transport network planning system 210 and the map data store 325 return the requested information to the data processing module 310, which sends the information to the candidate route selection module 315 along with the selected objectives for the route.

In some aspects, the data processing module 310 accesses network and environmental data needed to calculate candidate routes for VTOL travel based on one or more selected parameters and/or objectives. In one embodiment, the data processing module 310 queries the transport network planning system 210 to obtain data regarding the locations of VTOL hubs as well as the environmental data between the first hub and the second hub. The data processing module 310 further queries the transportation data store to obtain data regarding the presence, location, and planned routes of VTOL aircraft between the first hub and the second hub. The transport network planning system 210 and the transportation data store return the requested information to the data processing module 310, which sends the information to the candidate route selection module 315 along with the selected objectives for the route.

The candidate route selection module 315 identifies candidate routes for VTOL aircraft travel between a first hub and a second hub. In one embodiment, to determine the candidate routes, the candidate route selection module 315 computes different routes between the first hub and the second hub that each optimizes for a different parameter or combination of parameters associated with the network and environmental parameters and objectives. Each optimization function is associated with a set of optimized parameters and assigns weights to the optimized parameters such that the routing options generated by the function optimizes for parameters having higher weights relative to parameters having lower weights. For example, an optimization function may assign a higher weight to the network traffic along a candidate route relative to the total distance traveled, and therefore, the generated routing option may avoid areas in which other VTOL hubs are located, but travel a larger distance. In other embodiments, the candidate routes between the first and second hubs are determined in other ways. For example, a network planner may manually select a set of routes between the pair of hubs (e.g., by tracing them on a map, selecting a series of waypoints, or the like). Regardless of how the candidate routes are determined, in one example embodiment, the candidate route selection module 315 stores (e.g., in a database) a set of candidate routes between each pair of hubs in the transport network. The candidate routes from a first hub to a second hub may be the same of different from the candidate routes from the second hub to the first hub.

The route selection module 320 selects the routes for specific VTOL aircraft 220 traveling from a first hub to a second hub. In one embodiment, the route selection module 320 retrieves the candidate routes from the first hub to the second hub from the candidate route selection module 315 and selects one of the candidates as the preferred route between the first hub and the second hub based on the selected network and environmental parameters and objectives. The route selection module 320 calculates a noise profile for each candidate route based on the noise generated by the VTOL aircraft 220 and other predicted noise sources along the candidate route (e.g., other VTOL aircraft 220, typical noise levels in the area at that time, etc.) as well as the pre-determined acceptable noise level in areas within a threshold distance of the candidate route. If the route selection module 320 determines that a noise profile exceeds a threshold level at any point along a candidate route, the route selection module 320 discards the candidate route as a possible option for the transport service. The route selection module 320 may select the candidate route that has the earliest estimated time of arrival at the second hub and that does not exceed the threshold noise level at any point along the route. Additionally or alternatively, different network and environmental parameters and objectives may be used to select the preferred route. For example, in one embodiment, the route selection module 320 calculates a route cost for each candidate route and selects the candidate route with the lowest route cost. The route cost may be a function of network and environmental factors such as the distance of the route, the anticipated amount of energy required to transport the VTOL aircraft 220 along the route, the cost to transport the VTOL aircraft 220 along the route, the anticipated noise level along the route, and anticipated observer annoyance.

The selected route is sent to the VTOL aircraft 220. In one embodiment, if the route selection module 320 determines that all of the candidate routes have noise profiles that exceed the threshold noise level, the route selection module 320 may notify the VTOL aircraft 220 that no acceptable routes currently exist for transport between the first hub and the second hub. The route selection module 320 may delay departure of the VTOL 220 and periodically (e.g., every five minutes) repeat the process until conditions have changed such that one of the candidate routes has a noise profile that does not exceed the noise threshold.

The sensor aggregation module 330 receives and aggregates data from various sensors. The sensors may include sonic, ultrasonic, passive IR, LIDAR, lighting, barometric, humidity, temperature, camera, and radar systems spread across various communication bands and in different quantities to support a variety of use cases. Some example use cases are described below, with reference to FIG. 4.

Figure 4:
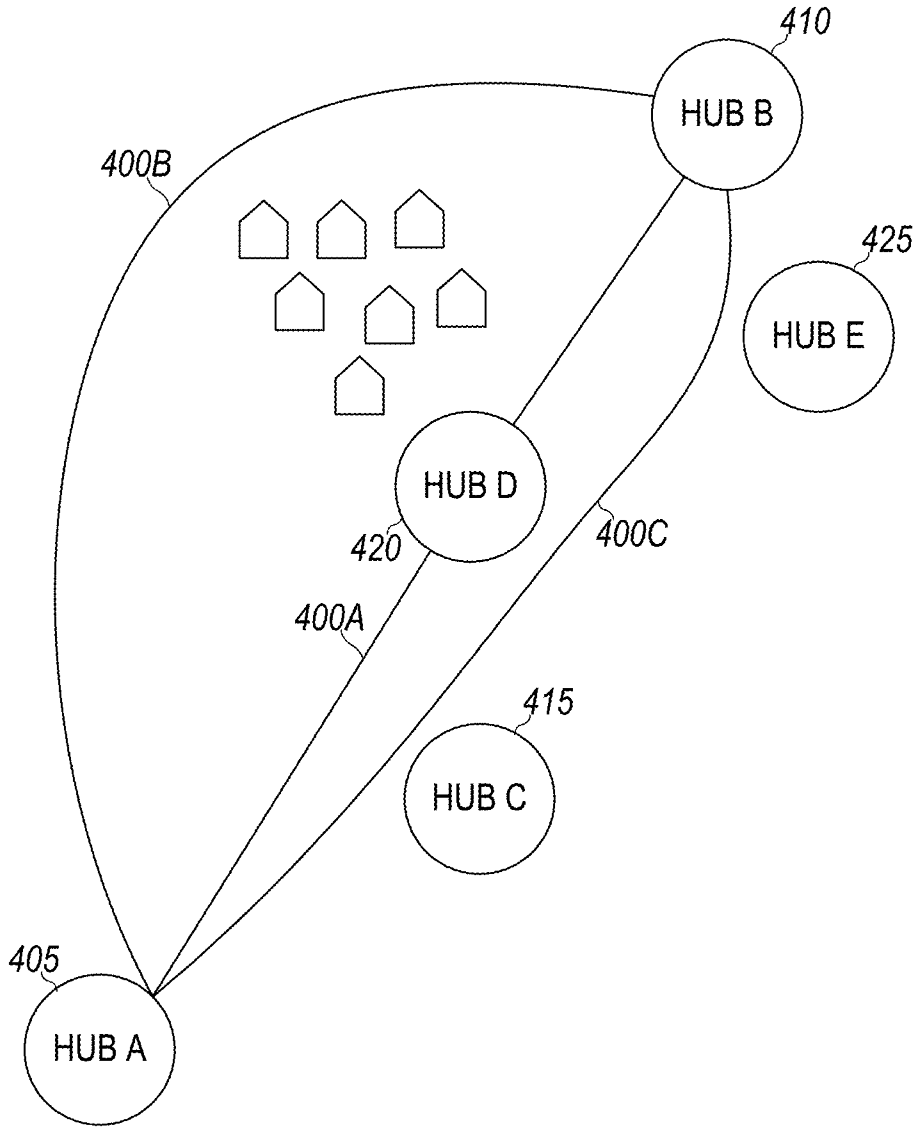
FIG. 4 illustrates candidate routes for optimal VTOL aircraft transport, in accordance with an embodiment.

FIG. 4 illustrates candidate routes for optimal VTOL aircraft transport, in accordance with an embodiment. In the embodiment shown in FIG. 4, the transport network coordination system 215 identifies candidate routes for transport between Hub A 405 and Hub B 410. Each candidate route 400A, 400B, and 400C is calculated based on network and environmental parameters and objectives, such as the presence and location of other VTOL hubs, current locations of other VTOL aircraft 220, planned routes of other VTOL aircraft 220, pre-determined acceptable noise levels and current and predicted weather between Hub A 405 and Hub B 410, and localized weather (e.g., sudden downbursts, localized hail, lightening, unsteady wind conditions, etc.) in the vicinity of the planned routes. Although three candidate routes are shown in FIG. 4, more or fewer candidate routes may be calculated in other embodiments.

Candidate route 400A represents a direct line of travel between Hub A 405 and Hub B 410 such that candidate route 400A is the shortest of the candidate routes in terms of distance traveled. However, as shown in FIG. 4, candidate route 400A passes over Hub D 420. In one embodiment, therefore, if other VTOL aircraft 220 are taking off and landing at Hub D 420, candidate route 400A might not be selected as the provisioned route for the transport to reduce air traffic congestion at and around Hub D.

As shown in FIG. 4, candidate route 400B would take the VTOL aircraft 220 around a residential area with low pre-determined acceptable noise levels to minimize the projection of noise into unwanted areas. However, candidate route 400B represents the longest total distance between Hub A 405 and Hub B 410 and might not be selected as the provisioned route for the VTOL aircraft 220 if other candidate routes that satisfy selected parameters and objectives and have a shorter total distance are available.

Finally, candidate route 400C is a shorter total distance than candidate route 400B and avoids the area of low pre-determined acceptable noise level. Further, while candidate route 400C passes near Hub C 415 and Hub E 425, the route does not pass directly over these other VTOL hubs. Therefore, if the selected network and environmental objectives include avoiding areas in which the pre-determined acceptable noise level is low, avoiding routes that pass within a threshold distance of one or more VTOL hubs, and/or minimizing the total distance traveled, the candidate route selection module 315 might select candidate route 400C as the preferred route between Hub A 405 and Hub B 410.

Exemplary Routing Method

Figure 5:
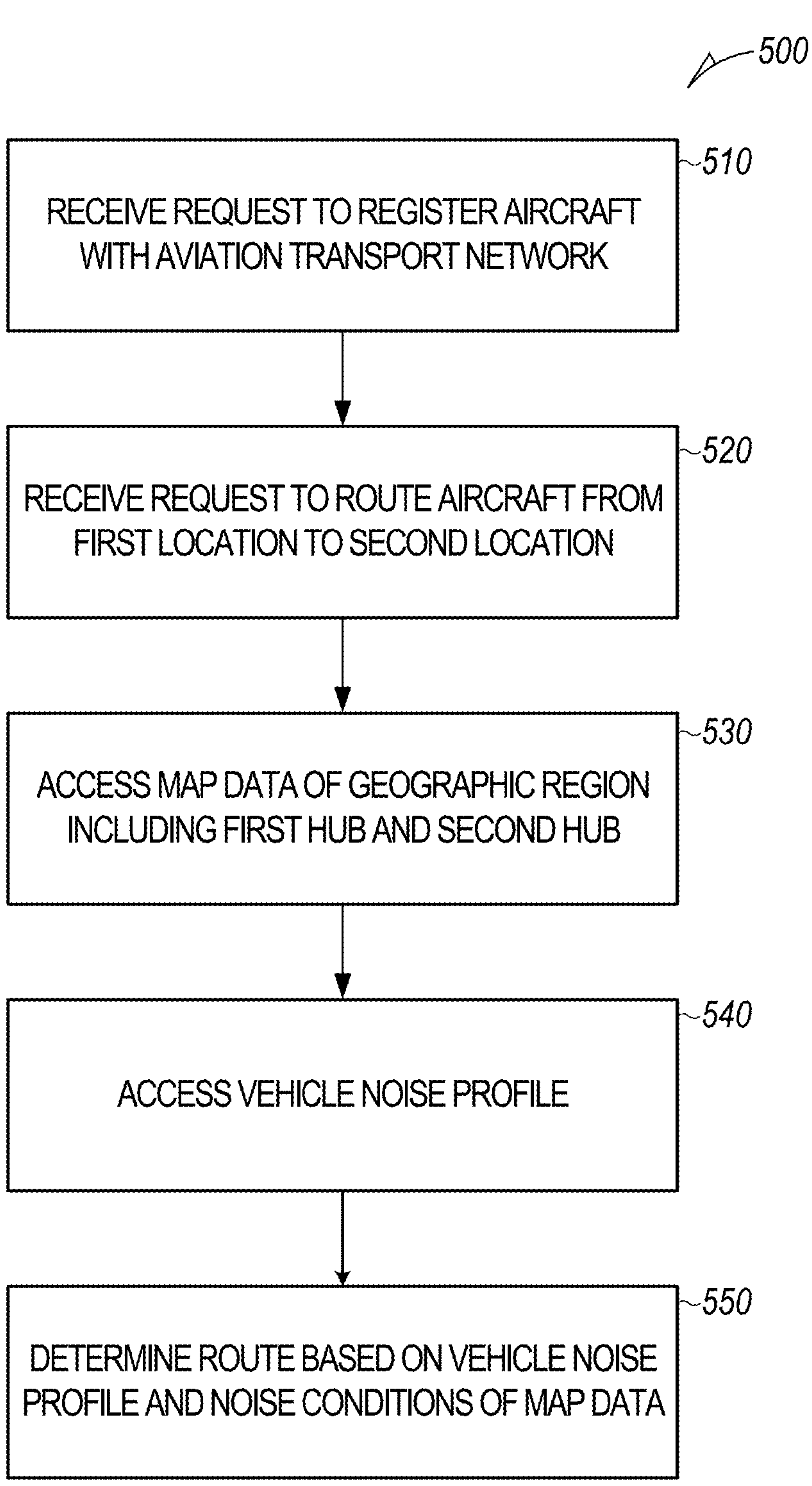
FIG. 5 is a flowchart illustrating a method for dynamic routing of a VTOL aircraft, in accordance with an embodiment.

FIG. 5 illustrates one embodiment of a method 500 for dynamic routing of a VTOL aircraft 220. The steps of FIG. 5 are illustrated from the perspective of the transport network coordination system 215 performing the method 500. However, some or all of the steps may be performed by other entities or components. In addition, some embodiments may perform the steps in parallel, perform the steps in different orders, or perform different steps. In some aspects, one or more of the functions discussed below with respect to method 800 may be performed by hardware processing circuitry. For example, as discussed below with respect to FIG. 11, instructions 1124 stored in a memory such as 1104 or 1106 may configure one or more processors 1102 to perform one or more of the functions discussed below.

In the embodiment shown in FIG. 5, the method 500 begins with the transport network coordination system 215 receiving 510 a request from a VTOL aircraft 220 to register the VTOL aircraft 220 with the aviation transport network. The transport network coordination system 215, which is a platform on which multiple carriers and multiple types of VTOL aircrafts can operate in an example embodiment, receives the registration request when, for example, a VTOL aircraft 220 goes online and is ready to provide services on the network. The request can include a unique vehicle identification (VID) and data indicative of the vehicle type and/or operator information. The transport network coordination system 215 can also receive, from the VTOL aircraft 220, vehicle state information including the charge level, the maintenance and/or health condition of the VTOL aircraft 220, and the distance to the next service or maintenance event. Additionally or alternatively, the transport network coordination system 215 can receive, from the VTOL aircraft 220, vehicle configuration data including seating capacity and configuration data.

At 520, the transport network coordination system 215 receives a request to route the VTOL aircraft 220 from a first location to a second location. In one embodiment, the routing request is generated in response to receiving a request from a user through a client device 240 for transportation from an origin location to a destination location. The transport network coordination system 215 may identify hubs corresponding to the first and second locations, which define an intermediary leg of the transport from the origin location to the destination location. For example, the transport might include a first leg in which the user is transported from an origin location to a first hub via a first ground-based vehicle or on foot, a second leg in which the user is transported from the first hub to a second hub via a VTOL aircraft 220, and a third leg in which the user is transported from the second hub to a destination location via a second ground-based vehicle or on foot. The transport network coordination system 215 can provide the determined first and second locations to the candidate route selection module 315 for computing candidate routes between the locations.

The data processing module 310 accesses 530 map data of a geographic region including the first hub and the second hub. Map data for a VTOL aircraft 220 may include data indicative of topology, buildings, flight envelope constraints, and acceptable noise levels or noise constraints. The map data may also be indicative of dynamic real-time information such as current weather in the area, localized weather, current noise levels, ambient noise level, air traffic, etc. Map data may also utilize previous weather, noise, and air traffic data for predictive purposes.

The data processing module 310 also accesses 540 vehicle noise profile data based on the vehicle data type of the VTOL aircraft 220. In one embodiment, the vehicle noise profile data includes a combination of precomputed estimates of noise using computational aeroacoustics of the VTOL aircraft 220 in various flight modes. Pressure data in the form of noise hemispheres is generated and propagated to different hypothetical observer locations. This data may also include data gathered from normal operation in different locales, times, and weather conditions. Such data can correspond to the vehicle type, the state of the health and maintenance of the VTOL aircraft 220, and gross weight. Computational analyses and real-time estimates may be verified and validated (both the pressure hemispheres and observed sound) for continued refinement of data and predictive capabilities. The noise profile data may be used to determine one or more estimates of noise levels along a candidate route. For example, for a given speed or engine power level, RPM, ambient moisture/temperature, and a given altitude, the noise profile may determine the estimated noise impact to the geographic area on the ground, surrounding buildings, hubs, and adjacent air vehicles. Additionally or alternatively, the noise profile may receive as input an operational noise level for the VTOL aircraft 220 (the level being selected based on meeting a maximum noise impact), and the noise profile can provide a performance level (including airspeed, altitude, passenger capacity, etc.) that can be used to optimize the routing.

At 550, the route selection module 320 determines a route for the VTOL aircraft 220 based on the vehicle noise profile and noise conditions of the map data. The route selection module 320 may determine a route cost for a number of predetermined candidate routes and select the candidate route with the lowest route cost. In one embodiment, route cost may be a function of distance, energy, cost, time, noise, observer annoyance, etc. Due to the temporal nature of the data utilized for optimization, the route selection module 320 may use Kalman filtering and/or predictive neural nets to filter and weight inputs and constraints to the VTOL routing algorithm. In one embodiment, candidate routes meet minimum acceptable or optimal criteria for flight. These paths may be visualized as convex hulls around the VTOL aircraft 220 itself and the interaction of this separation space with adjacent hulls (due to other vehicles, infrastructure, etc.) as a way to geometrically compute and visualize relevant or available routes. Optimization methods may be checked for continuity to ensure that generated routes meet realizable speed and maneuverability targets of operating vehicles. Relative vehicle information (e.g., position, velocity, state-of-charge, etc.) is also utilized to understand first-order effects of other aircraft within the vicinity of the VTOL aircraft 220.

Figure 6:
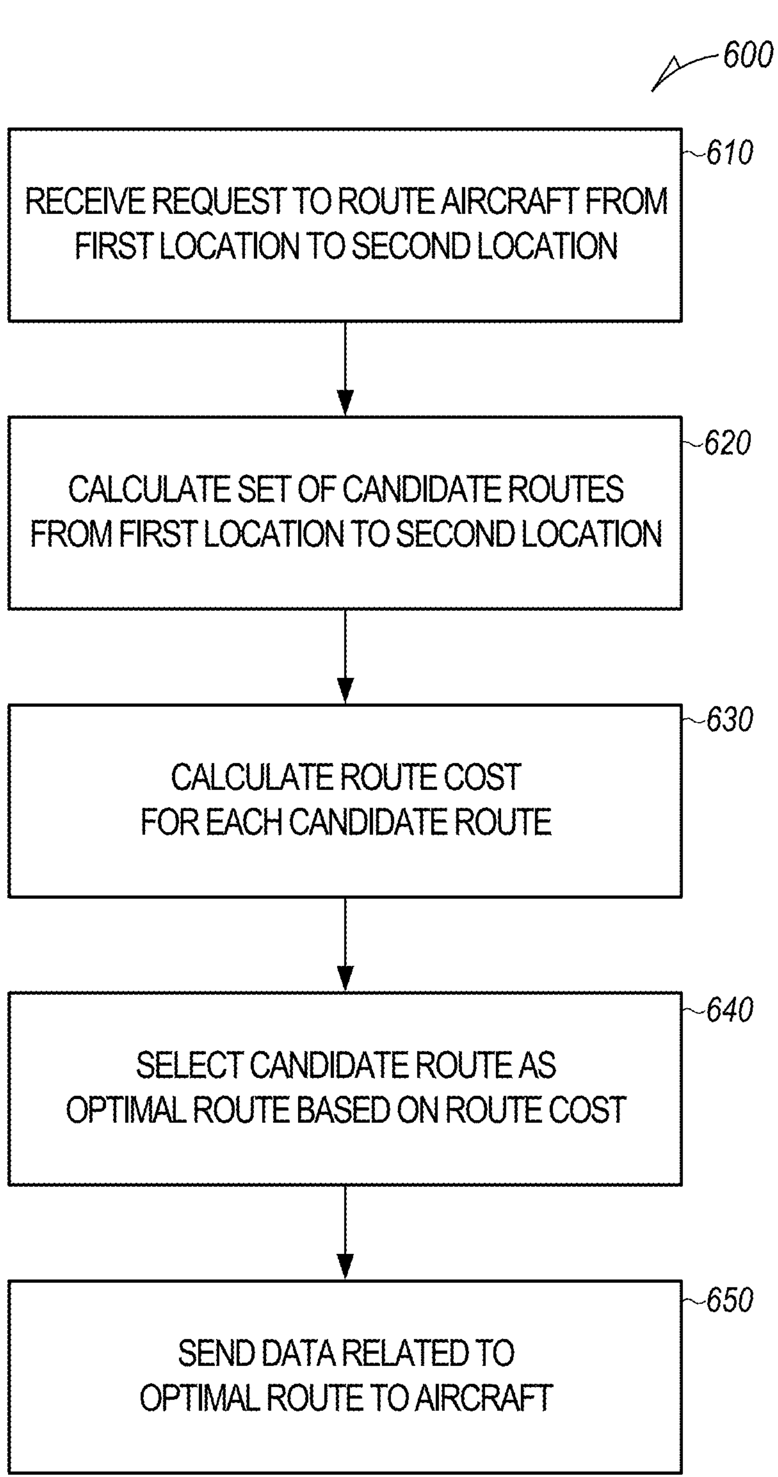
FIG. 6 is a flowchart illustrating a method for determining a route from a first VTOL aircraft hub to a second VTOL aircraft hub, in accordance with an embodiment.

FIG. 6 is illustrates one embodiment of a method 600 for determining a route from a first VTOL aircraft hub to a second VTOL aircraft hub. The steps of FIG. 6 are illustrated from the perspective of the transport network coordination system 215 performing the method 600. some aspects, one or more of the functions discussed below with respect to method 800 may be performed by hardware processing circuitry. For example, as discussed below with respect to FIG. 11, instructions 1124 stored in a memory such as 1104 or 1106 may configure one or more processors 1102 to perform one or more of the functions discussed below. However, some or all of the steps may be performed by other entities or components. In addition, some embodiments may perform the steps in parallel, perform the steps in different orders, or perform different steps.

In the embodiment shown in FIG. 6, the method 600 begins with the transport network coordination system 215 receiving 610 a request to route a VTOL aircraft 220 from a first location to a second location. In one embodiment, the routing request is generated in response to receiving at least one request from a user through a client device 240 for transportation from an origin location to a destination location. The transportation from the origin location to the destination location may include a first leg during which a first ground-based vehicle transports the user from the origin location to the first location (i.e., a first VTOL hub), a second leg during which a VTOL aircraft 220 transports the user from the first location to a second location (i.e., a second VTOL hub), and a third leg during which a second ground-based vehicle transports the user from the second location to the destination location.

At 620, the candidate route selection module 315 calculates a set of candidate routes from the first location to the second location (i.e., for the second leg of the trip). In one embodiment, the candidate route selection module 315 computes different routes between the first location and the second location that each optimize for a different network or environmental parameters, such as pre-determined acceptable noise levels, the locations of other VTOL aircraft 220 and VTOL hubs, weather, predicted travel time, and the like. Alternatively, candidate routes may be manually selected (e.g., by selecting a series of waypoints between the first location and the second location).

For each candidate route in the set of candidate routes, the route selection module 320 calculates a route cost. In one embodiment, the route cost is a function of the network and/or environmental factors, such as the distance of the route, the anticipated amount of energy required to transport the VTOL aircraft 220 along the route, the cost to transport the VTOL aircraft 220 along the route, and the like. In some embodiments, the route selection module 320 selects a first candidate route with the lowest route cost and determines a noise profile for the route. If the route selection module 320 determines that the noise profile for the first candidate route is at or below an acceptable noise profile threshold, the route selection module 320 selects 640 the route as the provisioned route for the VTOL aircraft 220. Alternatively, if the route selection module 320 determines that the noise profile for the first candidate route exceeds the acceptable noise profile threshold, the route selection module 320 discards the first candidate route and calculates a noise profile for the candidate route with the second lowest noise profile. The route selection module 320 continues to calculate noise profiles for candidate routes until the route selection module 320 identifies a candidate route with a noise profile below the noise profile threshold. Responsive to selecting a candidate route as the provisioned route for the VTOL aircraft 220, the route selection module 320 sends data related to the provisioned route to the VTOL aircraft 220.

Sensor Data Aggregation

Figure 7:
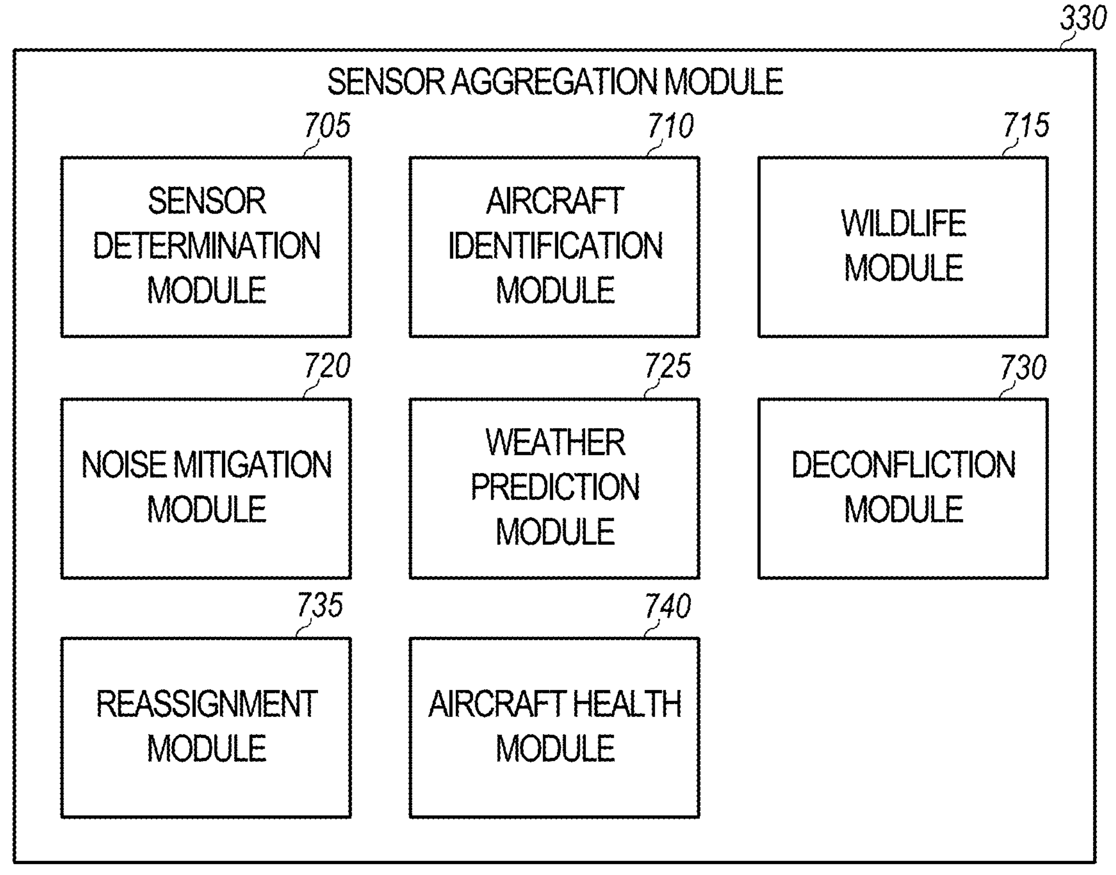
FIG. 7 illustrates one embodiment of the sensor aggregation module shown in FIG. 3.

FIG. 7 illustrates one embodiment of the sensor aggregation module 330 shown in FIG. 3. In the embodiment shown in FIG. 7, the sensor aggregation module 330 includes a sensor determination module 705, an aircraft identification module 710, a wildlife module 715, a noise mitigation module 720, a weather prediction module 725, a deconfliction module 730, a reassignment module 735, and an aircraft health module 740. In other embodiments, the sensor aggregation module 330 may include different and/or additional elements. Furthermore, the functionality may be distributed between components in manners different than described.

It can be desirable that a vertiport remain aware of its noise impact and other environmental conditions. Noise and other data may be collected and aggregated by the sensor determination module 705 to enable the performance of noise mitigation and other vertiport management functions. In one embodiment, sensors are affixed or physically integrated at the vertiport and/or data is gathered on an ad-hoc basis via microphones and/or other sensors within a geographic vicinity of the vertiport. The sensors may also be fixed to ground based infrastructure, ground vehicles, air vehicles, and/or user devices (e.g., smart phones). The sensors send collected data to the sensor determination module 705 (e.g., via the network 270).

At any given time, a data collection radius around the vertiport may be defined to determine which sensors to use for data collection relevant to the vertiport. In the case of noise collectors (e.g., microphones), the sensors may receive a signal to turn on (if not already on) and then begin collecting noise data. This data may be processed onboard the collector initially to filter out irrelevant or irregular noise patterns before sending to the network. At the network level, additional processing may occur to generate a location-based noise or perception map which can then be made available to the vertiport to help with operational or airspace related decision-making.

Previously collected noise data may also be utilized for smart-filtering. An understanding of temporally regular events may be used to determine whether data collection should be more or less frequent. Moreover, predicted perceived noise levels or computed acoustics due to aircraft trajectories can be utilized to better select noise collectors for adequate sampling quality and size. Throughout a day, the data collection radius may be dynamically scaled to ensure that noise perception levels are not exceeded in and around the vertiport while also balancing computing resources.

A distributed sensing array can be composed of sonic, ultrasonic, passive IR, LIDAR, lighting, barometric, humidity, temperature, camera, and radar systems spread across various communication bands and in different quantities to support a variety of use cases. Each sensor array can come equipped with adequate actuators, cleaning jets/sprays, wipers, and the like to provide continued operation in different environments and weather situations. Various use cases for sensor data are described below, with continued reference to FIG. 7

Aircraft Identification

In day-to-day operations, it may be desirable that vertiports and any related airspace management system can identify aircraft in operation. While much of this identification can be facilitated via backend protocols, in some embodiment physical identification and confirmation of the aircraft assets may be desirable. In one embodiment, the aircraft ID module 710 receives one or more of photo, IR, LIDAR, multispectral, or radar data. The aircraft ID module processes the data to identify and track aircraft. These observations may be of the aircraft itself or artifacts of aircraft flight (e.g. photo capture of wingtip vortices characteristic of a certain aircraft type or LIDAR moisture measurements in the wake of an aircraft's flight path).

Wildlife Sensing and Repelling

The wildlife module 715 uses one or more of multispectral sensors, IR, radar, cameras, and microphones to sense ground and air wildlife. The synthesis of sensor data from more than one source may assist in the correct identification of the type of wildlife and determine a proper response. If the wildlife can be correctly identified, adequate responses in the form of light or sound can be transmitted to the observed wildlife for their safety and to prevent vertiport interference. The transmitted response can be tailored to the wildlife's aural and visual capabilities. Keeping wildlife away from the vertiport vicinity may reduce the chances of the wildlife being harmed inadvertently. This also reduces the likelihood of aircraft, sensing, and infrastructure assets being negatively affected by direct or indirect effects of wildlife proximity, such as habitation or waste.

Successful day to day operations may include managing a noise profile at and around vertiports for community acceptance. The microphones and speakers included in a distributed sensing array may enable vertiports to quantify their noise impact at and around the vicinity. In one embodiment, the noise mitigation module 720 quantifies the impact of the vertiport on noise levels and compares a current noise signature with predicted and threshold noise signatures to act accordingly. The noise mitigation module 720 may take corrective action to reduce noise levels, such as limiting landing and takeoff for aircraft meeting a specific signature threshold. This can also result in commands or constraints conveyed from the network to the aircraft system to mitigate noise signature by specific methods such as slowing down propellers or activating different control surfaces or more generalized methods like approach, departure, and transition directions.

The weather prediction module 725 characterizes the weather and microclimates around vertiports. This may assist with safe and efficient eVTOL and UAV operation. In dense urban environments, a sudden change in weather conditions can result in wind conditions which may significantly alter the way aircraft land and depart from vertiports. In one embodiment, weather data can be gathered via temperature, barometric, LIDAR (moisture monitoring), and radar data (S or X band). Changes in weather may additionally or alternatively be indirectly calculated based on perceived changes in IR or multispectral data from aircraft. This indirect delta may take into account the aircrafts routing history, age, and temporal effects.

The weather prediction module 725 may monitor ground effect and gusts at final approaches and take offs (FATOs) and touchdowns and liftoffs (TLOFs). Using sensors to characterize velocity and pressure fields close to the ground plane which can then be compared to predictive characterizations of the vertiport may help schedule vehicle takeoffs and landings and reduce the likelihood of failure mode realization.

Some cities may have multiple operators of VTOL flights to meet different city needs. In one embodiment, the deconfliction module 730 uses data from sensor arrays to identify aircraft from these other operators (e.g., if their systems are uncommunicative or their vehicles go rogue). Combined with onboard sensors from aircraft, the vertiport sensing array data can feed data to the airspace management tool and network to determine various options for deconfliction.

Depending on the combination of vertiport layout, weather conditions, wildlife concerns, and airspace environment, in some embodiments a FATO area previously allocated for landing can be switched for takeoffs and vice versa. In one embodiment, the reassignment module 735 uses data gathered from a distributed sensing array to make a determination of whether the FATO purpose be reassigned and to provide instructions accordingly to human operators, hub management systems 230, and/or VTOLs 220.

Sensor data can also provide insights into the health and state of a VTOL 220. In one embodiment, the aircraft health module 740 receives recordings of, for example, propeller rotations, multispectral imagery of composite structures, and/or IR imagery of aircraft approaching and departing the vertiport. The recordings can be compared to a 'digital twin' of the aircraft to identify potential problems. Over time, this can be used for correlative analysis and root cause determination for failures. This data can also help route vehicles at the right time to maintenance depots for inspection and tuning. Moreover, closer to inspection periods, this can help inform how vehicles are placed and located to minimize their geographic distance to the depots themselves.

Additionally, aircraft may be programmed to emit specific noises to indicate the state of its health. Speakers strategically placed at parking pads or in the TLOF or FATO can be programmed to actively seek these signals for proper maintenance or operational actions to take place.

Takeoff and landing in urban environments may be difficult due to unwanted gusts, wind patterns, and abrupt changes in weather. In a network utilizing a non-homogenous fleet, some vehicles may have better controllability in these uncertain weather conditions when compared to others. In embodiments where there are various dedicated sensors to collect weather data (mobile and fixed data collectors) as well as weather data available, the network may optimize and reprioritize the allocation of aircraft such that a vertiport expecting or experiencing tricky weather conditions will send and receive aircraft that will be able to land in those weather conditions. The data to ground these decisions may include wind speed, air pressure, temperature, moisture, and the like. This may happen on a trip by trip basis or be extended to combinations of trips so that vehicles with more limited controllability envelopes are biased towards operating in vertiports with more favorable weather conditions.

Figure 8:
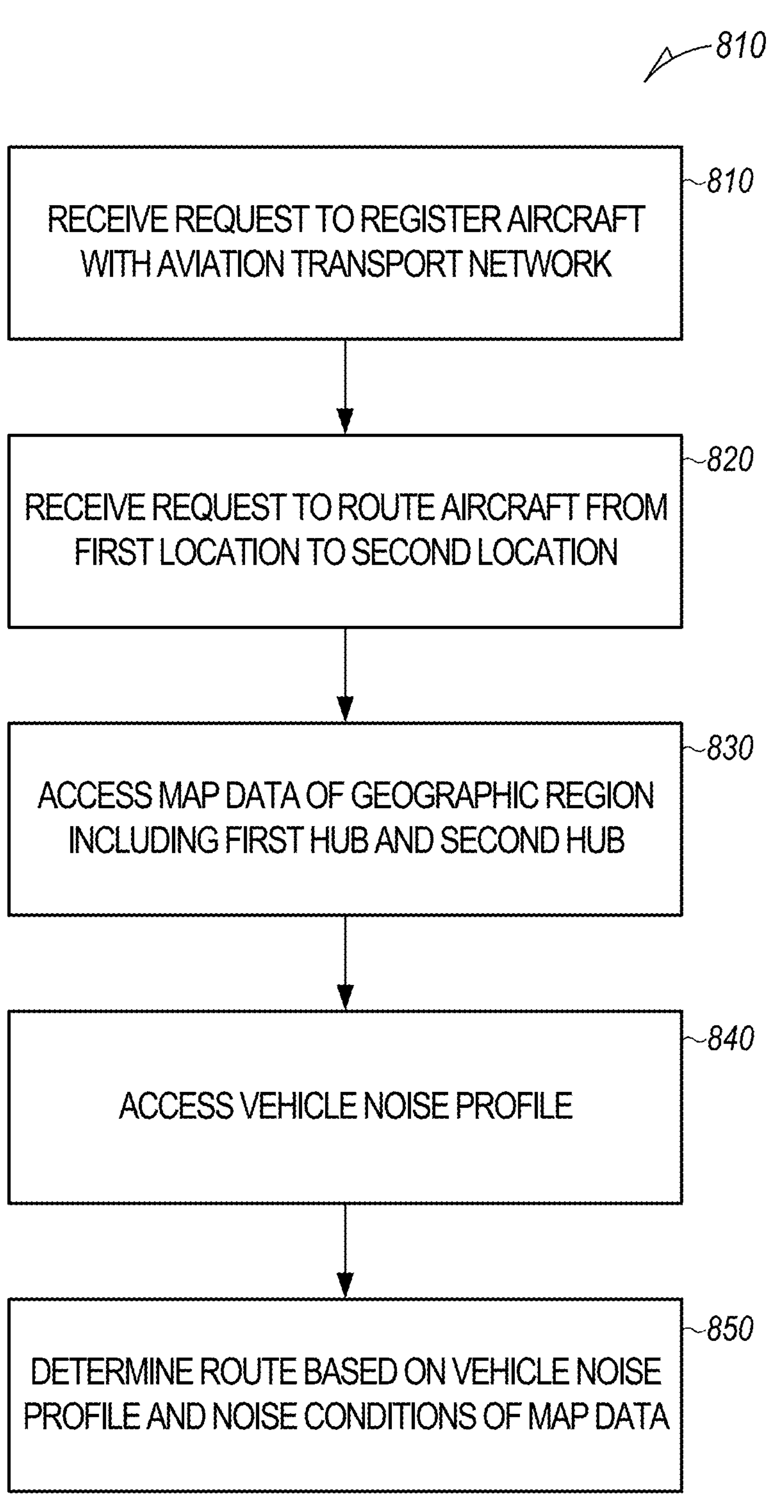
FIG. 8 illustrates one embodiment of a method for dynamic routing of a VTOL aircraft.

FIG. 8 illustrates one embodiment of a method 800 for dynamic routing of a VTOL aircraft 220. In some aspects, one or more of the functions discussed below with respect to method 800 may be performed by hardware processing circuitry. For example, as discussed below with respect to FIG. 11, instructions 1124 stored in a memory such as 1104 or 1106 may configure one or more processors 1102 to perform one or more of the functions discussed below. The steps of FIG. 8 are illustrated from the perspective of the transport network coordination system 215 performing the method 800. However, some or all of the steps may be performed by other entities or components. In addition, some embodiments may perform the steps in parallel, perform the steps in different orders, or perform different steps.

In the embodiment shown in FIG. 8, the method 800 begins with the transport network coordination system 215 receiving 810 a request from a VTOL aircraft 220 to register the aircraft 220 with the aviation transport network. The transport network coordination system 215, which is a platform on which multiple carriers and multiple types of VTOL aircrafts can operate in an example embodiment, receives the registration request when, for example, a VTOL aircraft 220 goes online and is ready to provide services on the network. The request can include a unique vehicle identification (VID) and data indicative of the vehicle type and/or operator information. The transport network coordination system 215 can also receive, from the VTOL aircraft 220, vehicle state information including the charge level, the maintenance and/or health condition of the VTOL aircraft 220, and the distance to the next service or maintenance event. Additionally or alternatively, the transport network coordination system 215 can receive, from the VTOL aircraft 220, vehicle configuration data including seating capacity and configuration data.

At 820, the transport network coordination system 215 receives a request to route the VTOL aircraft 220 from a first location to a second location. In one embodiment, the routing request is generated in response to receiving a request from a user through a client device 240 for transportation from an origin location to a destination location. The transport network coordination system 215 may identify hubs corresponding to the first and second locations, which define an intermediary leg of the transport from the origin location to the destination location. The transport network coordination system 215 can provide the determined first and second locations to the candidate route selection module 315 for computing candidate routes between the locations.

The data processing module 310 accesses at 830 map data of a geographic region including the first hub and the second hub. Map data for a VTOL aircraft 220 may include data indicative of topology, buildings, flight envelope constraints, and acceptable noise levels or noise constraints. The map data may also be indicative of dynamic real-time information such as weather, current noise levels, ambient noise level, air traffic, etc. Map data may also utilize previous weather, noise, and air traffic data for predictive purposes.

The data processing module 310 also accesses at 840 vehicle noise profile data based on the vehicle data type of the VTOL aircraft 220. In one embodiment, the vehicle noise profile data includes a combination of precomputed estimates of noise using computational aeroacoustics of the VTOL aircraft 220 in various flight modes. Pressure data in the form of noise hemispheres is generated and propagated to different hypothetical observer locations. This data may also include data gathered from normal operation in different locales, times, and weather conditions. Such data can correspond to the vehicle type, the state of the health and maintenance of the VTOL aircraft 220, and gross weight. Computational analyses and real-time estimates may be verified and validated (both the pressure hemispheres and observed sound) for continued refinement of data and predictive capabilities. The noise profile data may be used to determine one or more estimates of noise levels along a candidate route. For example, for a given speed or engine power level, RPM, ambient moisture/temperature, and a given altitude, the noise profile may determine the estimated noise impact to the geographic area on the ground, surrounding buildings, hubs, and adjacent air vehicles. Additionally or alternatively, the noise profile may receive as input an operational noise level for the VTOL aircraft 220 (the level being selected based on meeting a maximum noise impact), and the noise profile can provide a performance level (including airspeed, altitude, passenger capacity, etc.) that can be used to optimize the routing.

At 850, the route selection module 320 determines a route for the VTOL aircraft 220 based on the vehicle noise profile and noise conditions of the map data. The route selection module 320 may determine a route cost for a number of predetermined flight corridors and select the corridor with the lowest route cost. In one embodiment, route cost may be a function of distance, energy, cost, time, noise, observer annoyance, etc. Due to the temporal nature of the data utilized for optimization, the route selection module 320 may use Kalman filtering and/or predictive neural nets to filter and weight inputs and constraints to the VTOL routing algorithm. In one embodiment, candidate routes meet minimum acceptable or optimal criteria for flight. These paths may be visualized as convex hulls around the VTOL aircraft 220 itself and the interaction of this separation space with adjacent hulls (due to other vehicles, infrastructure, etc.) as a way to geometrically compute and visualize relevant or available routes. Optimization methods may be checked for continuity to ensure that generated routes meet realizable speed and maneuverability targets of operating vehicles. Relative vehicle information (e.g., position, velocity, state-of-charge, etc.) is also utilized to understand first-order effects of other aircraft within the vicinity of the VTOL aircraft 220.

Figure 9:
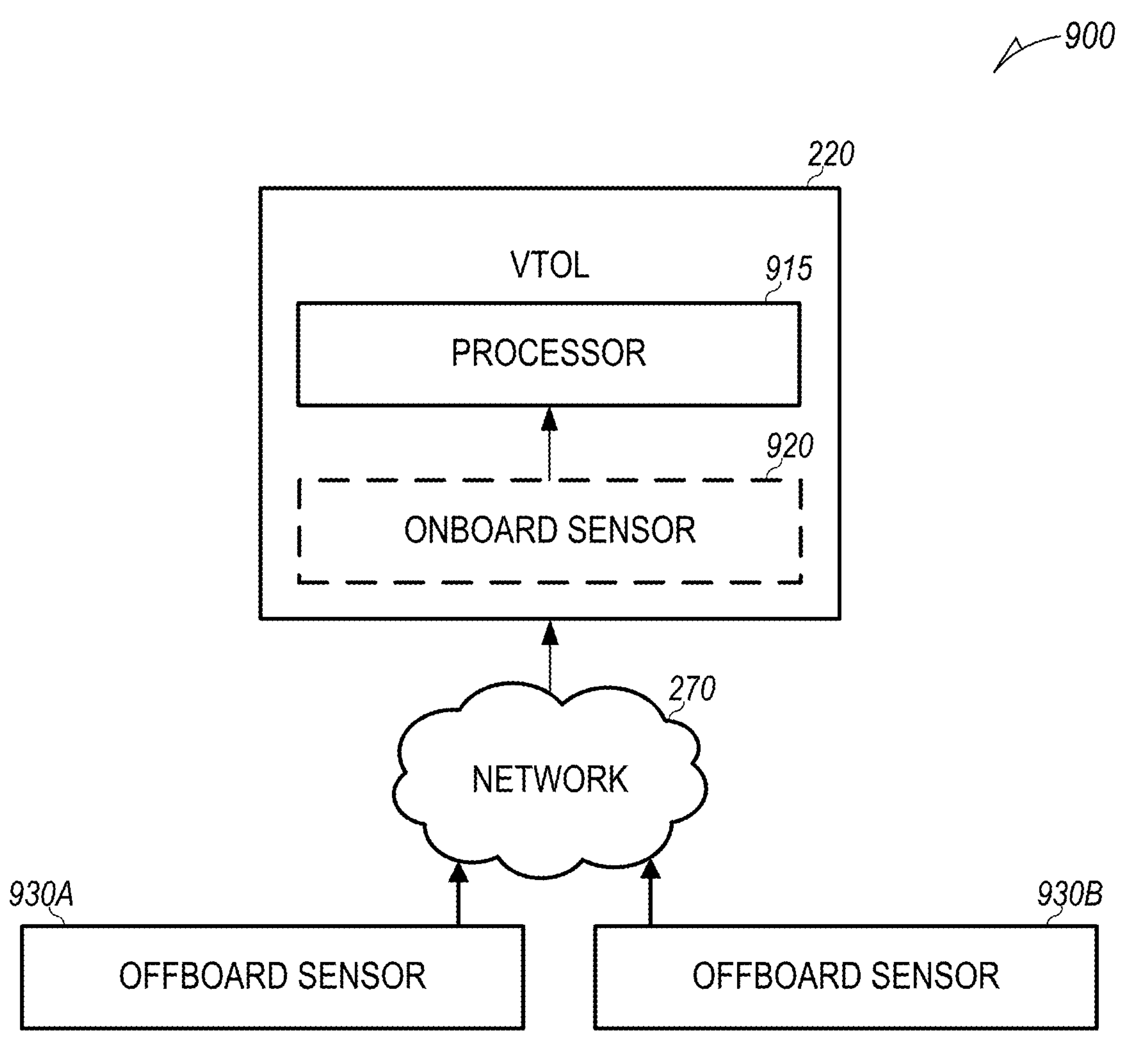
FIG. 9 is a system diagram showing an embodiment using offboard sensor data for noise mitigation.

FIG. 9 is a system diagram showing an embodiment using offboard sensor data for noise mitigation. In the embodiment shown in FIG. 9, a VTOL aircraft 220 is commutatively coupled to one or more offboard sensors 930 via a network 270. The one or more offboard sensors 930 are configured to collect noise data and provide the noise data to the computer system (e.g., controller 915) of the VTOL aircraft 220 for processing. For example, in one embodiment, a first offboard sensor is at location D and a second offboard sensor is at location E, where location D is the starting vertiport location and location E is the ending vertiport location.

In addition, the VTOL aircraft 220 may include one or more onboard sensors 920. The one or more onboard sensors 920 collect operational data of the VTOL aircraft 220, including noise data, and provide the operational data to the computer system for processing. Onboard sensors 920 may additionally or alternatively be configured to measure other operational data such as speed and direction of the VTOL aircraft 220.

In some embodiments, the noise data includes a time-stamp that indicates the time at which the noise data was acquired. The noise data may include location data (e.g., GPS coordinates) that indicate a location at which the noise data was acquired. Fidelity of the noise data may be determined at the network level or at the VTOL aircraft 220 level. For example, at the network level, the fidelity of the noise data is determined by the data processing module 710. At the VTOL aircraft 220 level, the fidelity of the noise data is determined by a processor 915.

In some embodiments, a machine learning (ML) model is trained using a training set of noise data. The ML model is configured to generate predictive temporal data for noise signature mitigation. In other words, the ML model may predict future noise signatures based on current sensor data. This may be used to modify VTOL routing to reduce environmental noise impacts. For example, the VTOL aircraft 220 may modify its route to avoid flying over geographic areas for which the predicted noise level exceeds a threshold. The ML model may be part of the data processing module 310, with updated routing information being provided to the VTOL aircraft 220 by the route selection module 320. Alternatively, route modifications may be determined at the VTOL aircraft 220 (e.g., by the processor 915).

In the embodiment shown in FIG. 9, the VTOL aircraft 220 includes a computer system, as described above with reference to FIG. 2. The computer system includes a processor 915 for processing the received noise data. The VTOL aircraft 220 flies at a speed v in a direction x. The processor 915 performs a matrix multiplication between a noise gain vector and a VTOL vector representing a controllability assessment of the VTOL aircraft 220. The noise gain vector may define the noise signature that would like to be achieved. The VTOL vector is a controllability assessment of the vehicle. In other words, the state vector describes the status of the VTOL aircraft 220 and various ones of its systems and subsystems. The matrix product is sent from the VTOL aircraft 220 to the transport network coordination system 215 via the network 270. Alternatively, in some embodiments, the VTOL aircraft 220 sends the VTOL vector to the transport coordination system 215 which performs the matrix multiplication (e.g., at the data processing module 310).

Based on the matrix product, the VTOL aircraft 220 may make adjustments to the way it is flying to reduce environmental impact. In some embodiments, the VTOL aircraft 220 further includes a controller (not shown in FIG. 9) for controlling various components of the VTOL aircraft 220. For example, the controller changes translative speed, propeller speed, or choices in propulsor usage (e.g., a quiet propulsor vs. a high thrust, noisy propulsor) to modify the noise profile in the vicinity of the VTOL aircraft 220.

Alternatively or additionally, noise mitigation actions may be decided at the network level to balance concerns across a city and relieve computing constraints on the aircraft. For example, the route selection module 320 of the transport network coordination system 215 may determine that the route or operational parameters (e.g., propeller speed, etc.) of a VTOL aircraft 220 should be updated in view of the determined noise profile based on operations of multiple VTOL aircraft. The route selection module 320 may send updated routing instructions to one or more of the VTOL aircraft 220 via the network 270.

Figure 10:
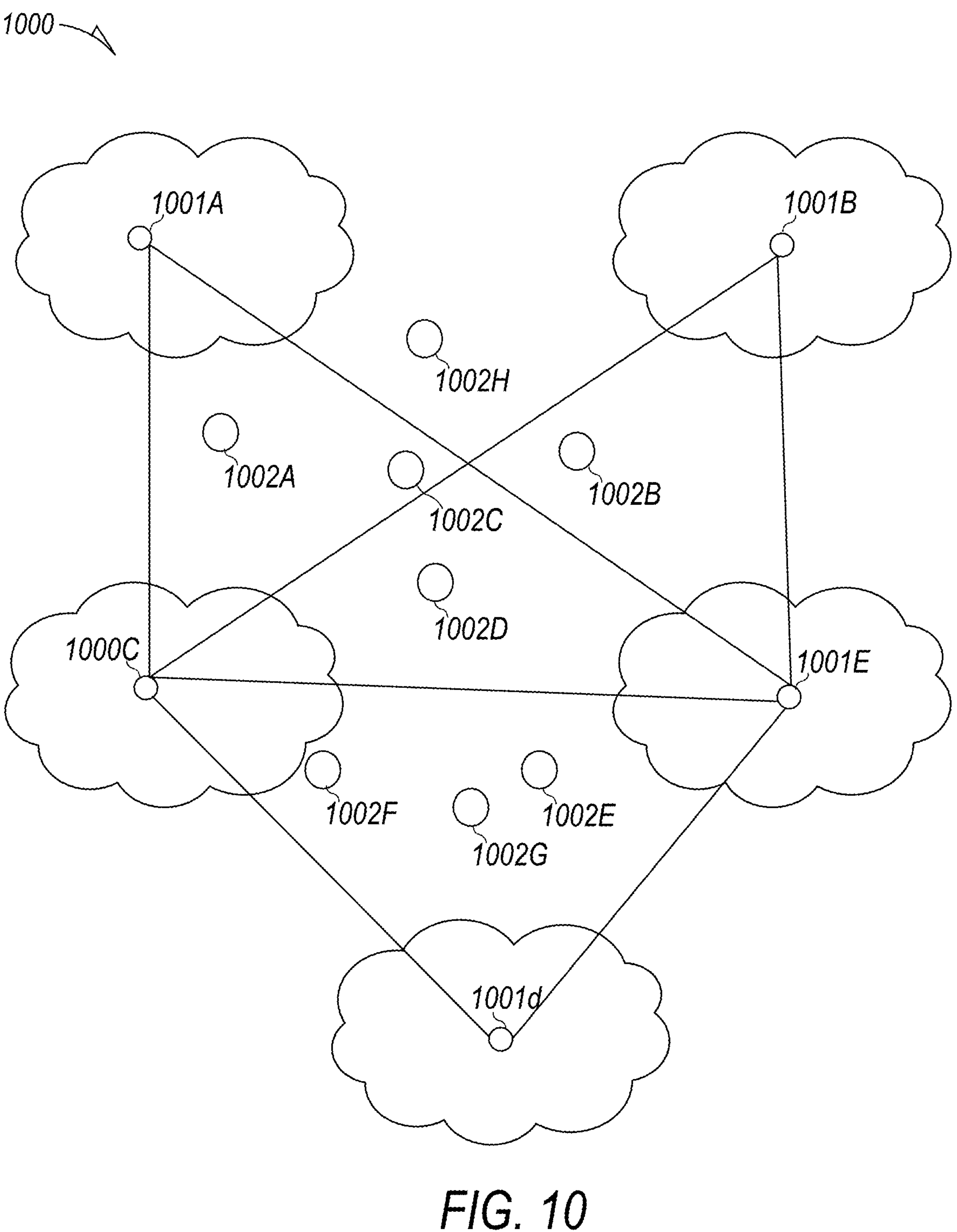

Referring to FIG. 10, a network of vertiports is defined with nodes labeled 1001*a-e* and flights between nodes denoted by connecting lines, according to one embodiment. Noise collectors exist across the geographic area and are denoted by 1002*a-h*. The noise collectors may be fixed or mobile. The noise signature of each vertiport is defined by non-convex polygons surrounding each node. Node B is surrounded by two such non-convex polygons to represent a potential alteration of its noise signature. The noise signature can be computed regularly using a composite of distributed noise measurements.

The noise in the urban environment may be affected due to urban air mobility. Flights in and around vertiports may change perceived noise levels and it may be desirable to manage these impacts to observers at the vertiport level. The noise signature of a vertiport may be managed via one or more techniques. Example techniques, which may be used alone or in combination, are described below.

In one embodiment, the overall vertiport throughout may be increased or decreased dynamically. The perceived noise level in and around the vertiport is a function of the amount of trips occurring in and around the vertiport. If the vertiport noise signature cannot be mitigated by the control of vehicles or selection of operating vehicles alone, overall throughput at the vertiport may be modified for more or less trips.

In another embodiment, the vehicles routed to the vertiport are filtered based on their noise impact. Depending on current perceived noise levels, vehicles may be allowed or disallowed from landing and taking-off based on vehicle predicted operating noise signatures. When a vertiport is closer to threshold perceived noise levels, routing of quieter vehicles to and from that vertiport may become more frequent.

In a further embodiment, the approach and departure pathways for a vertoport may be changed to manage the vertiport's noise profile. Once vehicles have been selected for optimal takeoff and landing, their routing may be modified such that they do not fly over places with higher sensitivity to perceived noise. Vehicle speeds and/or rates of climb may also be adjusted to manage the vertiport's noise profile. Once a path for vehicle has been decided, the perceived noise level impact of the vehicle (which contributes to the overall noise signature of the vertiport) can be modified by altering a vehicle's speed and/or rate of climb/descent. This is because an aircraft's noise signature is a function of its pressure delta on the ambient environment which is controlled by how much it actively disturbs the air.

Figure 11:
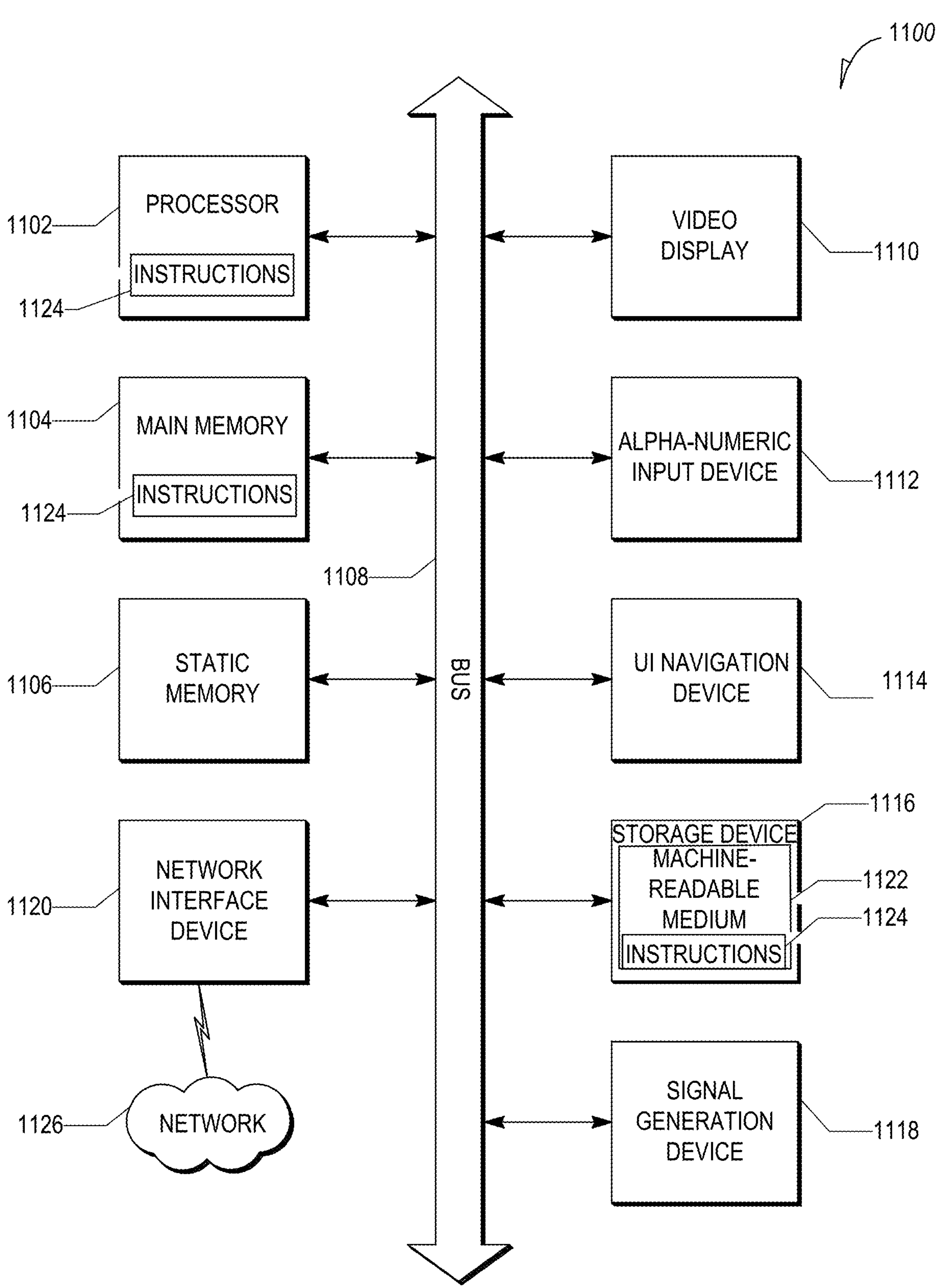
FIG. 11 is a block diagram of a machine that may be implemented in one or more of the disclosed embodiments.

FIG. 11 is a block diagram illustrating a computing device hardware architecture 1100, within which a set or sequence of instructions can be executed to cause a machine to perform examples of any one of the methodologies discussed herein. The hardware architecture 1100 describes a computing device for executing the vehicle autonomy system, described herein.

The architecture 1100 may operate as a standalone device or may be connected (e.g., networked) to other machines. In a networked deployment, the architecture 1100 may operate in the capacity of either a server or a client machine in server-client network environments, or it may act as a peer machine in peer-to-peer (or distributed) network environments. The architecture 1100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1100 includes a processor unit 1102 comprising at least one processor (e.g., a central processing unit (CPU), a graphics processing unit (GPU), or both, processor cores, compute nodes). The architecture 1100 may further comprise a main memory 1104 and a static memory 1106, which communicate with each other via a link 1108 (e.g., bus). The architecture 1100 can further include a video display unit 1110, an input device 1112 (e.g., a keyboard), and a UI navigation device 1114 (e.g., a mouse). In some examples, the video display unit 1110, input device 1112, and UI navigation device 1114 are incorporated into a touchscreen display. The architecture 1100 may additionally include a storage device 1116 (e.g., a drive unit), a signal generation device 1118 (e.g., a speaker), a network interface device 1120, and one or more sensors (not shown), such as a Global Positioning System (GPS) sensor, compass, accelerometer, or other sensor.

In some examples, the processor unit 1102 or another suitable hardware component may support a hardware interrupt. In response to a hardware interrupt, the processor unit 1102 may pause its processing and execute an ISR, for example, as described herein.

The storage device 1116 includes a machine-readable medium 1122 on which is stored one or more sets of data structures and instructions 1124 (e.g., software) embodying or used by any one or more of the methodologies or functions described herein. The instructions 1124 can also reside, completely or at least partially, within the main memory 1104, within the static memory 1106, and/or within the processor unit 1102 during execution thereof by the architecture 1100, with the main memory 1104, the static memory 1106, and the processor unit 1102 also constituting machine-readable media.

Executable Instructions and Machine-Storage Medium

The various memories (i.e., 1104, 1106, and/or memory of the processor unit(s) 1102) and/or storage device 1116 may store one or more sets of instructions and data structures (e.g., instructions) 1124 embodying or used by any one or more of the methodologies or functions described herein. These instructions, when executed by processor unit(s) 1102 cause various operations to implement the disclosed examples.

As used herein, the terms "machine-storage medium," "device-storage medium," "computer-storage medium" (referred to collectively as "machine-storage medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1122 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1124 can further be transmitted or received over a communications network 1126 using a transmission medium via the network interface device 1120 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72 (b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

Example 1 is a non-transitory computer readable storage medium comprising instructions that when executed configure hardware processing circuitry to perform operations for dynamically routing a VTOL aircraft in a transportation system, the operations comprising: receiving, at the transportation system, a request to route the VTOL aircraft from a first location to a second location, the request generated in response to receiving one or more requests for transport services from client devices associated with users of the transportation system; calculating a set of candidate routes from the first location to the second location; calculating a route cost for each candidate route in the set of candidate routes, wherein the route cost is a function of one or more network or environmental factors; responsive to at least one candidate route of the set of candidate routes having a route cost at or below an acceptable route cost threshold, selecting a candidate route as a provisioned route for the transport services based in part on the route cost; and sending data related to the provisioned route to the VTOL aircraft.

In Example 2, the subject matter of Example 1 optionally includes the operations further comprising accessing map data of a geographic region including the first location and the second location and wherein the route costs are based on the map data.

In Example 3, the subject matter of any one or more of Examples 1-2 optionally include wherein the request for transport services includes a request for transportation from an origin location to a destination location, the transport services including: a first leg from the origin location to the first location; a second leg from the first location to the second location, the second leg being serviced by a VTOL aircraft; and a third leg from the second location to the destination location.

In Example 4, the subject matter of any one or more of Examples 1-3 optionally include wherein each candidate route in the set of candidate routes optimizes for an objective determined based on one or more of the network or environmental parameters.

In Example 5, the subject matter of any one or more of Examples 1-4 optionally include wherein the network factors include a number of VTOL aircraft that will be at the first location within a specified time period.

In Example 6, the subject matter of any one or more of Examples 1-5 optionally include wherein the network parameters include locations of one or more transportation hubs between the first location and the second location.

In Example 7, the subject matter of any one or more of Examples 1-6 optionally include wherein the environmental parameters include pre-determined acceptable noise levels between the first location and the second location.

In Example 8, the subject matter of any one or more of Examples 1-7 optionally include wherein the environmental parameters include current and predicted weather between the first location and the second location.

In Example 9, the subject matter of any one or more of Examples 1-8 optionally include the operations further comprising: determining that the route costs for each of the candidate routes exceeds an acceptable route cost threshold; and periodically recalculating the route costs for each of the candidate routes until at least one candidate route has a route cost at or below the acceptable route cost threshold.

In Example 10, the subject matter of any one or more of Examples 1-9 optionally include wherein the route cost in based in part on vehicle noise profile data for the VTOL aircraft.

Example 11 is an apparatus for dynamically routing a VTOL aircraft in a transportation system, the apparatus comprising: hardware processing circuitry; one or more hardware memories storing instructions that when executed configure the hardware processing circuitry to perform operations comprising: receiving, at the transportation system, a request to route the VTOL aircraft from a first location to a second location, the request generated in response to receiving one or more requests for transport services from client devices associated with users of the transportation system; calculating a set of candidate routes from the first location to the second location; calculating a route cost for each candidate route in the set of candidate routes, wherein the route cost is a function of one or more network or environmental factors; responsive to at least one candidate route of the set of candidate routes having a route cost at or below an acceptable route cost threshold, selecting a candidate route as a provisioned route for the transport services based in part on the route cost; and sending data related to the provisioned route to the VTOL aircraft.

In Example 12, the subject matter of Example 11 optionally includes the operations further comprising accessing map data of a geographic region including the first location and the second location and wherein the route costs are based on the map data.

In Example 13, the subject matter of any one or more of Examples 11-12 optionally include wherein the request for transport services includes a request for transportation from an origin location to a destination location, the transport services including: a first leg from the origin location to the first location; a second leg from the first location to the second location, the second leg being serviced by a VTOL aircraft; and a third leg from the second location to the destination location.

In Example 14, the subject matter of any one or more of Examples 11-13 optionally include wherein each candidate route in the set of candidate routes optimizes for an objective determined based on one or more of the network or environmental parameters.

In Example 15, the subject matter of any one or more of Examples 11-14 optionally include wherein the network factors include a number of VTOL aircraft that will be at the first location within a specified time period.

In Example 16, the subject matter of any one or more of Examples 11-15 optionally include wherein the network parameters include locations of one or more transportation hubs between the first location and the second location.

In Example 17, the subject matter of any one or more of Examples 11-16 optionally include wherein the environmental parameters include pre-determined acceptable noise levels between the first location and the second location.

In Example 18, the subject matter of any one or more of Examples 11-17 optionally include wherein the environmental parameters include current and predicted weather between the first location and the second location.

In Example 19, the subject matter of any one or more of Examples 11-18 optionally include determining that the route costs for each of the candidate routes exceeds an acceptable route cost threshold; and periodically recalculating the route costs for each of the candidate routes until at least one candidate route has a route cost at or below the acceptable route cost threshold.

In Example 20, the subject matter of any one or more of Examples 11-19 optionally include wherein the route cost in based in part on vehicle noise profile data for the VTOL aircraft.

Example 21 is a method for dynamically routing a VTOL aircraft in a transportation system, the method comprising: receiving, at the transportation system, a request to route the VTOL aircraft from a first location to a second location, the request generated in response to receiving one or more requests for transport services from client devices associated with users of the transportation system; calculating a set of candidate routes from the first location to the second location; calculating a route cost for each candidate route in the set of candidate routes, wherein the route cost is a function of one or more network or environmental factors; responsive to at least one candidate route of the set of candidate routes having a route cost at or below an acceptable route cost threshold, selecting a candidate route as a provisioned route for the transport services based in part on the route cost; and sending data related to the provisioned route to the VTOL aircraft.

In Example 22, the subject matter of Example 21 optionally includes accessing map data of a geographic region including the first location and the second location and wherein the route costs are based on the map data.

In Example 23, the subject matter of any one or more of Examples 21-22 optionally include wherein the request for transport services includes a request for transportation from an origin location to a destination location, the transport services including: a first leg from the origin location to the first location; a second leg from the first location to the second location, the second leg being serviced by a VTOL aircraft; and a third leg from the second location to the destination location.

In Example 24, the subject matter of any one or more of Examples 21-23 optionally include wherein each candidate route in the set of candidate routes optimizes for an objective determined based on one or more of the network or environmental parameters.

In Example 25, the subject matter of any one or more of Examples 21-24 optionally include wherein the network factors include a number of VTOL aircraft that will be at the first location within a specified time period.

In Example 26, the subject matter of any one or more of Examples 21-25 optionally include wherein the network parameters include locations of one or more transportation hubs between the first location and the second location.

In Example 27, the subject matter of any one or more of Examples 21-26 optionally include wherein the environmental parameters include pre-determined acceptable noise levels between the first location and the second location.

In Example 28, the subject matter of any one or more of Examples 21-27 optionally include wherein the environmental parameters include current and predicted weather between the first location and the second location.

In Example 29, the subject matter of any one or more of Examples 21-28 optionally include determining that the route costs for each of the candidate routes exceeds an acceptable route cost threshold; and periodically recalculating the route costs for each of the candidate routes until at least one candidate route has a route cost at or below the acceptable route cost threshold.

In Example 30, the subject matter of any one or more of Examples 21-29 optionally include wherein the route cost in based in part on vehicle noise profile data for the VTOL aircraft.

Example 31 is an apparatus for dynamically routing a VTOL aircraft in a transportation system, the method comprising: means for receiving, at the transportation system, a request to route the VTOL aircraft from a first location to a second location, the request generated in response to receiving one or more requests for transport services from client devices associated with users of the transportation system; means for calculating a set of candidate routes from the first location to the second location; means for calculating a route cost for each candidate route in the set of candidate routes, wherein the route cost is a function of one or more network or environmental factors; means for selecting a candidate route as a provisioned route for the transport services based in part on the route cost, the selecting responsive to at least one candidate route of the set of candidate routes having a route cost at or below an acceptable route cost threshold; and means for sending data related to the provisioned route to the VTOL aircraft.

In Example 32, the subject matter of Example 31 optionally includes means for accessing map data of a geographic region including the first location and the second location and wherein the route costs are based on the map data.

In Example 33, the subject matter of any one or more of Examples 31-32 optionally include wherein the request for transport services includes a request for transportation from an origin location to a destination location, the transport services including: a first leg from the origin location to the first location; a second leg from the first location to the second location, the second leg being serviced by a VTOL aircraft; and a third leg from the second location to the destination location.

In Example 34, the subject matter of any one or more of Examples 31-33 optionally include wherein each candidate route in the set of candidate routes optimizes for an objective determined based on one or more of the network or environmental parameters.

In Example 35, the subject matter of any one or more of Examples 31-34 optionally include wherein the network factors include a number of VTOL aircraft that will be at the first location within a specified time period.

In Example 36, the subject matter of any one or more of Examples 31-35 optionally include wherein the network parameters include locations of one or more transportation hubs between the first location and the second location.

In Example 37, the subject matter of any one or more of Examples 31-36 optionally include wherein the environmental parameters include pre-determined acceptable noise levels between the first location and the second location.

In Example 38, the subject matter of any one or more of Examples 31-37 optionally include wherein the environmental parameters include current and predicted weather between the first location and the second location.

In Example 39, the subject matter of any one or more of Examples 31-38 optionally include means for determining that the route costs for each of the candidate routes exceeds an acceptable route cost threshold; and means for periodically recalculating the route costs for each of the candidate routes until at least one candidate route has a route cost at or below the acceptable route cost threshold.

In Example 40, the subject matter of any one or more of Examples 31-39 optionally include wherein the route cost in based in part on vehicle noise profile data for the VTOL aircraft.

Example 41 is a method for dynamically routing a VTOL aircraft in a transportation, system, the method comprising: receiving, at the transportation system, a request to route the VTOL aircraft from a first location to a second location, the request generated in response to receiving one or more requests for transport services from client devices associated with users of the transportation system; calculating a set of candidate routes from the first location to the second location; selecting, from the set of candidate routes, a provisioned route for the transport services based on a noise profile of the candidate route; and sending data related to the provisioned route to the VTOL aircraft.

In Example 42, the subject matter of Example 41 optionally includes wherein selecting the provisioned route comprises: calculating a cost score for each candidate route in the set of candidate routes, wherein the cost score is based on one or more network or environmental factors; selecting a first candidate route with a lowest cost score; determining whether a noise profile for the first candidate route remains at or below an acceptable noise profile threshold for the first candidate route; and responsive to determining that the noise profile remains at or below the acceptable noise profile threshold, selecting the first candidate route as the provisioned route.

In Example 43, the subject matter of any one or more of Examples 41-42 optionally include wherein selecting the provisioned route comprises: calculating a cost score for each candidate route in the set of candidate routes, wherein the cost score is based on one or more network or environmental factors; selecting a first candidate route with a lowest cost score; responsive to determining that a noise profile of the first candidate route exceeds an acceptable noise profile threshold at a point on the first candidate route, selecting a second candidate route with a next lowest cost score; and responsive to determining that a noise profile of the second candidate route remains at or below the acceptable noise profile threshold, selecting the second candidate route as the provisioned route.

In Example 44, the subject matter of any one or more of Examples 41-43 optionally include wherein the request for transport services includes a request for transportation from an origin location to a destination location, the transport services including: a first leg from the origin location to the first location; a second leg from the first location to the second location, the second leg being serviced by a VTOL aircraft; and a third leg from the second location to the destination location.

In Example 45, the subject matter of any one or more of Examples 41-44 optionally include wherein the network parameters include a number of VTOL aircrafts that will be at the first location within a specified time period.

In Example 46, the subject matter of any one or more of Examples 41-45 optionally include wherein the environmental parameters include current and predicted weather between the first location and the second location.

In Example 47, the subject matter of any one or more of Examples 41-46 optionally include wherein the noise profile is based on noise profile data of the VTOL aircraft and other predicted noise sources along the provisioned route.

In Example 48, the subject matter of Example 47 optionally includes wherein the noise profile threshold is based on pre-determined acceptable noise levels in geographic areas within a threshold distance of the candidate route.

In Example 49, the subject matter of any one or more of Examples 41-48 optionally include determining that the noise profile for each of the candidate routes exceeds an acceptable noise threshold; and periodically recalculating the noise profile for each of the candidate routes until at least one candidate route has a noise profile at or below the acceptable noise threshold.

In Example 50, the subject matter of any one or more of Examples 41-49 optionally include accessing map data of a geographic region including the first location and the second location and wherein the cost score is based on the map data.

Example 51 is an apparatus for dynamically routing a VTOL aircraft in a transportation, system, the apparatus comprising: hardware processing circuitry; one or more hardware memories storing instructions that when executed configure the hardware processing circuitry to perform operations comprising: receiving, at the transportation system, a request to route the VTOL aircraft from a first location to a second location, the request generated in response to receiving one or more requests for transport services from client devices associated with users of the transportation system; calculating a set of candidate routes from the first location to the second location; selecting, from the set of candidate routes, a provisioned route for the transport services based on a noise profile of the candidate route; and sending data related to the provisioned route to the VTOL aircraft.

In Example 52, the subject matter of Example 51 optionally includes wherein selecting the provisioned route comprises: calculating a cost score for each candidate route in the set of candidate routes, wherein the cost score is based on one or more network or environmental factors; selecting a first candidate route with a lowest cost score; determining whether a noise profile for the first candidate route remains at or below an acceptable noise profile threshold for the first candidate route; and responsive to determining that the noise profile remains at or below the acceptable noise profile threshold, selecting the first candidate route as the provisioned route.

In Example 53, the subject matter of any one or more of Examples 51-52 optionally include wherein selecting the provisioned route comprises: calculating a cost score for each candidate route in the set of candidate routes, wherein the cost score is based on one or more network or environmental factors; selecting a first candidate route with a lowest cost score; responsive to determining that a noise profile of the first candidate route exceeds an acceptable noise profile threshold at a point on the first candidate route, selecting a second candidate route with a next lowest cost score; and responsive to determining that a noise profile of the second candidate route remains at or below the acceptable noise profile threshold, selecting the second candidate route as the provisioned route.

In Example 54, the subject matter of any one or more of Examples 51-53 optionally include wherein the request for transport services includes a request for transportation from an origin location to a destination location, the transport services including: a first leg from the origin location to the first location; a second leg from the first location to the second location, the second leg being serviced by a VTOL aircraft; and a third leg from the second location to the destination location.

In Example 55, the subject matter of any one or more of Examples 51-54 optionally include wherein the network parameters include a number of VTOL aircrafts that will be at the first location within a specified time period.

In Example 56, the subject matter of any one or more of Examples 51-55 optionally include wherein the environmental parameters include current and predicted weather between the first location and the second location.

In Example 57, the subject matter of any one or more of Examples 51-56 optionally include wherein the noise profile is based on noise profile data of the VTOL aircraft and other predicted noise sources along the provisioned route.

In Example 58, the subject matter of Example 57 optionally includes wherein the noise profile threshold is based on pre-determined acceptable noise levels in geographic areas within a threshold distance of the candidate route.

In Example 59, the subject matter of any one or more of Examples 51-58 optionally include the operations further comprising: determining that the noise profile for each of the candidate routes exceeds an acceptable noise threshold; and periodically recalculating the noise profile for each of the candidate routes until at least one candidate route has a noise profile at or below the acceptable noise threshold.

In Example 60, the subject matter of any one or more of Examples 51-59 optionally include the operations further comprising accessing map data of a geographic region including the first location and the second location and wherein the cost score is based on the map data.

Example 61 is a non-transitory computer readable medium comprising instructions that when executed configure hardware processing circuitry to perform operations for dynamically routing a VTOL aircraft in a transportation, system, the operations comprising: receiving, at the transportation system, a request to route the VTOL aircraft from a first location to a second location, the request generated in response to receiving one or more requests for transport services from client devices associated with users of the transportation system; calculating a set of candidate routes from the first location to the second location; selecting, from the set of candidate routes, a provisioned route for the transport services based on a noise profile of the candidate route; and sending data related to the provisioned route to the VTOL aircraft.

In Example 62, the subject matter of Example 61 optionally includes wherein selecting the provisioned route comprises: calculating a cost score for each candidate route in the set of candidate routes, wherein the cost score is based on one or more network or environmental factors; selecting a first candidate route with a lowest cost score; determining whether a noise profile for the first candidate route remains at or below an acceptable noise profile threshold for the first candidate route; and responsive to determining that the noise profile remains at or below the acceptable noise profile threshold, selecting the first candidate route as the provisioned route.

In Example 63, the subject matter of any one or more of Examples 61-62 optionally include wherein selecting the provisioned route comprises: calculating a cost score for each candidate route in the set of candidate routes, wherein the cost score is based on one or more network or environmental factors; selecting a first candidate route with a lowest cost score; responsive to determining that a noise profile of the first candidate route exceeds an acceptable noise profile threshold at a point on the first candidate route, selecting a second candidate route with a next lowest cost score; and responsive to determining that a noise profile of the second candidate route remains at or below the acceptable noise profile threshold, selecting the second candidate route as the provisioned route.

In Example 64, the subject matter of any one or more of Examples 61-63 optionally include wherein the request for transport services includes a request for transportation from an origin location to a destination location, the transport services including: a first leg from the origin location to the first location; a second leg from the first location to the second location, the second leg being serviced by a VTOL aircraft; and a third leg from the second location to the destination location.

In Example 65, the subject matter of any one or more of Examples 61-64 optionally include wherein the network parameters include a number of VTOL aircrafts that will be at the first location within a specified time period.

In Example 66, the subject matter of any one or more of Examples 61-65 optionally include wherein the environmental parameters include current and predicted weather between the first location and the second location.

In Example 67, the subject matter of any one or more of Examples 61-66 optionally include wherein the noise profile is based on noise profile data of the VTOL aircraft and other predicted noise sources along the provisioned route.

In Example 68, the subject matter of Example 67 optionally includes wherein the noise profile threshold is based on pre-determined acceptable noise levels in geographic areas within a threshold distance of the candidate route.

In Example 69, the subject matter of any one or more of Examples 61-68 optionally include the operations further comprising: determining that the noise profile for each of the candidate routes exceeds an acceptable noise threshold; and periodically recalculating the noise profile for each of the candidate routes until at least one candidate route has a noise profile at or below the acceptable noise threshold.

In Example 70, the subject matter of any one or more of Examples 61-69 optionally include the operations further comprising accessing map data of a geographic region including the first location and the second location and wherein the cost score is based on the map data.

Example 71 is an apparatus for dynamically routing a VTOL aircraft in a transportation, system, the apparatus comprising: means for receiving, at the transportation system, a request to route the VTOL aircraft from a first location to a second location, the request generated in response to receiving one or more requests for transport services from client devices associated with users of the transportation system; means for calculating a set of candidate routes from the first location to the second location; means for selecting, from the set of candidate routes, a provisioned route for the transport services based on a noise profile of the candidate route; and means for sending data related to the provisioned route to the VTOL aircraft.

In Example 72, the subject matter of Example 71 optionally includes wherein the means for selecting the provisioned route comprises: means for calculating a cost score for each candidate route in the set of candidate routes, wherein the cost score is based on one or more network or environmental factors; means for selecting a first candidate route with a lowest cost score; means for determining whether a noise profile for the first candidate route remains at or below an acceptable noise profile threshold for the first candidate route; and means for selecting the first candidate route as the provisioned route responsive to determining that the noise profile remains at or below the acceptable noise profile threshold.

In Example 73, the subject matter of any one or more of Examples 71-72 optionally include wherein the means for selecting the provisioned route is configured to select the provisioned route by: calculating a cost score for each candidate route in the set of candidate routes, wherein the cost score is based on one or more network or environmental factors; selecting a first candidate route with a lowest cost score; responsive to determining that a noise profile of the first candidate route exceeds an acceptable noise profile threshold at a point on the first candidate route, selecting a second candidate route with a next lowest cost score; and responsive to determining that a noise profile of the second candidate route remains at or below the acceptable noise profile threshold, selecting the second candidate route as the provisioned route.

In Example 74, the subject matter of any one or more of Examples 71-73 optionally include wherein the request for transport services includes a request for transportation from an origin location to a destination location, the transport services including: a first leg from the origin location to the first location; a second leg from the first location to the second location, the second leg being serviced by a VTOL aircraft; and a third leg from the second location to the destination location.

In Example 75, the subject matter of any one or more of Examples 71-74 optionally include wherein the network parameters include a number of VTOL aircrafts that will be at the first location within a specified time period.

In Example 76, the subject matter of any one or more of Examples 71-75 optionally include wherein the environmental parameters include current and predicted weather between the first location and the second location.

In Example 77, the subject matter of any one or more of Examples 71-76 optionally include wherein the noise profile is based on noise profile data of the VTOL aircraft and other predicted noise sources along the provisioned route.

In Example 78, the subject matter of Example 77 optionally includes wherein the noise profile threshold is based on pre-determined acceptable noise levels in geographic areas within a threshold distance of the candidate route.

In Example 79, the subject matter of any one or more of Examples 71-78 optionally include means for determining that the noise profile for each of the candidate routes exceeds an acceptable noise threshold; and means for periodically recalculating the noise profile for each of the candidate routes until at least one candidate route has a noise profile at or below the acceptable noise threshold.

In Example 80, the subject matter of any one or more of Examples 71-79 optionally include means for accessing map data of a geographic region including the first location and the second location and wherein the cost score is based on the map data.

The description has been presented for the purpose of illustration; it is not intended to be exhaustive or to limit the scope of coverage to the precise forms disclosed. Persons skilled in the relevant art can appreciate that many modifications and variations are possible in light of the above disclosure.

Aspects of the disclosure, such as software for implementing the processes described herein, may be embodied in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of protection be limited not by this detailed description but rather by any claims that issue on an application based hereon. Accordingly, the disclosure of the embodiments described is intended to be illustrative but not) limiting of the scope of the claims.

The invention claimed is:

1. A computing system for performing aircraft identification, the computing system comprising:
- a distributed sensing array, wherein the distributed sensing array comprises:
  - a plurality of sensors distributed across a vertiport;
- one or more processors; and
- one or more non-transitory computer-readable media storing instructions that are executable by the one or more processors cause the computing system to perform operations, wherein the operations comprise:
  - obtaining sensor data from one or more of the plurality of sensors, wherein the sensor data describes noise associated with an aircraft in a vicinity of the vertiport; and
  - processing the sensor data to obtain a sensor-based identification of the aircraft, wherein the noise associated with the aircraft corresponds to a type of the aircraft.

2. The computing system of claim 1, wherein the operations comprise:

tracking the aircraft after obtaining the sensor-based identification.

3. The computing system of claim 1, wherein the operations comprise:

processing, using a backend protocol, an identification of the aircraft; and confirming the identification using the sensor-based identification.

4. The computing system of claim 1, comprising:

a sensor aggregation module operable to receive and aggregate data from the plurality of sensors;

wherein the operations comprise:

processing the sensor data using the sensor aggregation module to obtain the sensor-based identification of the aircraft.

5. The computing system of claim 1, wherein the plurality of sensors comprise one or more sensors selected from: sonic sensor systems, ultrasonic sensor systems, LIDAR sensor systems, camera sensor systems, or radar sensor systems.

6. The computing system of claim 1, wherein the sensor-based identification indicates that the aircraft is associated with an operator other than a first operator.

7. The computing system of claim 6, wherein the aircraft is uncommunicative.

8. The computing system of claim 6, wherein the first operator is associated with the vertiport, and wherein the aircraft is uncommunicative with one or more communications channels associated with the first operator.

9. The computing system of claim 6, wherein the plurality of sensors comprise microphones that are affixed at the vertiport.

10. The computing system of claim 6, wherein the plurality of sensors comprise one or more microphones that are fixed to, within the vicinity of the vertiport, at least one of: ground based infrastructure, a ground vehicle, an air vehicle, or a user device.

11. A computer-implemented method, comprising:

obtaining sensor data from one or more of a plurality of sensors of a distributed sensing array, wherein the distributed sensing array comprises the plurality of sensors distributed across a vertiport, wherein the sensor data describes noise associated with an aircraft in a vicinity of the vertiport; and processing the sensor data to obtain a sensor-based identification of the aircraft, wherein the noise associated with the aircraft corresponds to a type of the aircraft.

12. The computer-implemented method of claim 11, comprising:

tracking the aircraft after obtaining the sensor-based identification.

13. The computer-implemented method of claim 11, comprising:

processing, using a backend protocol, an identification of the aircraft; and confirming the identification using the sensor-based identification.

14. The computer-implemented method of claim 11, comprising:

processing the sensor data using a sensor aggregation module to obtain the sensor-based identification of the aircraft, the sensor aggregation module operable to receive and aggregate data from the plurality of sensors.

15. The computer-implemented method of claim 11, wherein the plurality of sensors comprise one or more sensors selected from: sonic sensor systems, ultrasonic sensor systems, LIDAR sensor systems, camera sensor systems, or radar sensor systems.

16. The computer-implemented method of claim 11, wherein the sensor-based identification indicates that the aircraft is associated with an operator other than a first operator.

17. The computer-implemented method of claim 16, wherein the aircraft is uncommunicative.

18. The computer-implemented method of claim 16, wherein the first operator is associated with the vertiport, and wherein the aircraft is uncommunicative with one or more communications channels associated with the first operator.

19. The computer-implemented method of claim 16, wherein the plurality of sensors comprise one or more microphones that are fixed to, within the vicinity of the vertiport, at least one of: ground based infrastructure, a ground vehicle, an air vehicle, or a user device.

20. A vertiport, comprising:

a plurality of sensors distributed across the vertiport; and a computing system operable to obtain sensor data from one or more of the plurality of sensors, wherein the sensor data describes noise associated with an aircraft in a vicinity of the vertiport, the computing system operable to process the sensor data to obtain a sensor-based identification of the aircraft, wherein the noise associated with the aircraft corresponds to a type of the aircraft.

* * * * *